US012754855B2

(12) United States Patent
Shin et al.

(10) Patent No.: US 12,754,855 B2
(45) Date of Patent: Oct. 6, 2026

(54) MEMORY CONTROLLER, STORAGE DEVICE INCLUDING THE SAME, AND OPERATING METHOD OF THE MEMORY CONTROLLER

(71) Applicant: Samsung Electronics Co., Ltd., Suwon-si (KR)

(72) Inventors: Mingon Shin, Uiwang-si (KR); Seungjae Lee, Hwaseong-si (KR); Jisoo Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 416 days.

(21) Appl. No.: 18/314,330

(22) Filed: May 9, 2023

(65) Prior Publication Data

US 2023/0273884 A1 Aug. 31, 2023

Related U.S. Application Data

(63) Continuation of application No. 17/036,386, filed on Sep. 29, 2020, now Pat. No. 11,681,637.

(30) Foreign Application Priority Data

Nov. 26, 2019 (KR) ........................ 10-2019-0153549

(51) Int. Cl.
*G06F 12/14* (2006.01)
*G06F 21/10* (2013.01)
(Continued)

(52) U.S. Cl.
CPC ...... *G06F 12/1466* (2013.01); *G06F 12/1408* (2013.01); *G06F 21/32* (2013.01);
(Continued)

(58) Field of Classification Search
CPC . G06V 40/13; G06F 12/1408; G06F 12/1466; G06F 12/1483; G06F 21/107;
(Continued)

(56) References Cited

U.S. PATENT DOCUMENTS

| | | | | |
|---|---|---|---|---|
| 5,623,637 A * | 4/1997 | Jones | G07F 7/1008 | 713/192 |
| 7,941,674 B2 * | 5/2011 | Ziv | G06F 21/72 | 713/189 |

(Continued)

FOREIGN PATENT DOCUMENTS

| | | |
|---|---|---|
| CN | 103577768 A | 2/2014 |
| JP | H 11187007 A | 7/1999 |

(Continued)

OTHER PUBLICATIONS

Chinese Office Action issued Mar. 23, 2026 in corresponding Chinese Application No. 202011156305.3.

*Primary Examiner* — Sharon S Lynch
(74) *Attorney, Agent, or Firm* — HARNESS, DICKEY & PIERCE, P.L.C.

(57) ABSTRACT

A memory controller for controlling a non-volatile memory device includes a key management unit configured to control an access right to a secure key based on a biometric authentication message and a unique value, which are received from an external device; and a data processing unit configured to encrypt data received from a host and decrypt data stored in the non-volatile memory device based on the secure key.

14 Claims, 15 Drawing Sheets

(51) Int. Cl.

| | |
|---|---|
| ***G06F 21/32*** | (2013.01) |
| ***G06F 21/60*** | (2013.01) |
| ***G06F 21/79*** | (2013.01) |
| ***G06V 40/13*** | (2022.01) |

(52) U.S. Cl.
CPC ............ *G06F 21/602* (2013.01); *G06F 21/79* (2013.01); *G06V 40/13* (2022.01); *G06F 21/107* (2023.08)

(58) Field of Classification Search
CPC ........ G06F 21/32; G06F 21/602; G06F 21/79; G06F 2212/1052; G06F 2212/7208
See application file for complete search history.

(56) References Cited

U.S. PATENT DOCUMENTS 8,001,387 B2 * 8/2011 Lee ....................... H04L 9/3231 726/33
8,001,391 B2 * 8/2011 Zaharris ................ H04L 9/0894 713/193
8,103,882 B2 * 1/2012 Ziv ....................... H04L 9/0894 711/100
8,234,500 B2 * 7/2012 Ziv ....................... G06F 21/602 713/193
8,429,416 B2 * 4/2013 Ooi ......................... G06F 21/31 713/186
8,438,647 B2 * 5/2013 Jevans .................... G06F 21/32 713/165
8,683,232 B2 * 3/2014 Yuen ....................... G06F 21/31 713/193
8,745,405 B2 * 6/2014 Pizano .................... G06F 21/32 713/186
8,745,409 B2 * 6/2014 Teicher ................... G06F 21/78 713/192
8,799,407 B2 * 8/2014 Pizano .................. G06F 21/602 709/219
9,049,010 B2 * 6/2015 Jueneman ........... H04L 63/0876
9,049,191 B2 * 6/2015 Inatomi ................... G06F 21/32
9,141,779 B2 * 9/2015 Shen ................... H04L 63/0861
9,160,532 B2 * 10/2015 Pizano .................. H04L 9/0816
9,202,059 B2 * 12/2015 Bhansali ............... G06F 21/602
9,521,123 B2 * 12/2016 Jueneman ............... H04L 9/085
9,576,154 B2 * 2/2017 Ramesh ................ H04L 9/0863
9,577,992 B2 * 2/2017 Zizi ....................... H04L 63/083
9,639,710 B2 * 5/2017 Cooley ................... G06F 21/31
9,755,830 B2 * 9/2017 Pizano .................... G06F 21/32
9,910,996 B2 * 3/2018 Braams ................... G06F 21/62
10,032,012 B2 * 7/2018 Ho ...................... H04L 63/0861
10,181,041 B2 * 1/2019 Bhansali ............... G06F 9/4406
10,181,042 B2 * 1/2019 Bhansali ............... G06F 21/575
10,461,942 B1 * 10/2019 Vo ......................... H04L 9/3263
10,516,533 B2 * 12/2019 Mannan ................ H04L 9/3226
10,764,054 B2 * 9/2020 Herder, III ................ H04L 9/14
10,904,234 B2 * 1/2021 Ross ................... H04L 63/0442
11,115,203 B2 * 9/2021 Herder, III ............ H04L 9/0866
11,343,099 B2 * 5/2022 Herder, III ............ H04L 9/0866
11,463,257 B2 * 10/2022 Chen ..................... H04L 9/3239
11,568,668 B2 * 1/2023 Moon ................ G06V 40/1376
11,804,959 B2 * 10/2023 Herder, III ............ H04L 9/3247
11,811,936 B2 * 11/2023 Herder, III .............. G06F 21/32
11,962,702 B2 * 4/2024 Prager ................... H04L 9/3213
12,067,800 B2 * 8/2024 Moon ................... G06F 3/0446
12,212,672 B2 * 1/2025 Herder, III ............. G06N 20/00
2004/0123127 A1 * 6/2004 Teicher ................... G06F 21/78 713/193
2007/0101434 A1 * 5/2007 Jevans .................... G06F 21/32 726/26
2007/0239994 A1 * 10/2007 Kulkarni ............... H04L 9/0866 713/189
2007/0250718 A1 * 10/2007 Lee ..................... H04L 63/0861 713/186
2007/0255963 A1 * 11/2007 Pizano .................... G06F 21/32 713/189
2008/0091833 A1 * 4/2008 Pizano ................ G06F 21/6218 709/229
2008/0263363 A1 * 10/2008 Jueneman ............. H04L 9/0877 713/184
2009/0034722 A1 * 2/2009 Zaharris ........... G11B 20/00086 380/44
2009/0055655 A1 * 2/2009 Ziv ....................... G06F 21/602 713/184
2009/0119502 A1 * 5/2009 Ziv ......................... G06F 21/78 711/E12.078
2009/0210722 A1 * 8/2009 Russo .................. H04L 9/0866 713/189
2009/0319798 A1 * 12/2009 Ooi ......................... G06F 21/34 713/182
2011/0035598 A1 * 2/2011 Pizano .................... H04L 63/06 713/193
2011/0107416 A1 * 5/2011 Poo ....................... H04L 9/3231 726/19
2011/0246790 A1 * 10/2011 Koh ........................ G06F 21/78 713/193
2011/0258460 A1 * 10/2011 Pizano .................... G06F 21/32 713/189
2011/0264919 A1 * 10/2011 Pizano .................. H04L 9/0816 713/186
2011/0314304 A1 * 12/2011 Braams ................... G06F 21/78 713/193
2012/0072724 A1 * 3/2012 Pizano .................. H04L 9/3242 713/165
2012/0089848 A1 * 4/2012 Ziv ..................... G06F 12/1466 713/183
2012/0297205 A1 * 11/2012 Yuen ....................... G06F 21/31 713/193
2013/0046993 A1 * 2/2013 Jueneman ............. H04L 9/0816 713/184
2013/0174243 A1 * 7/2013 Inatomi ................. H04L 9/3231 726/7
2013/0238908 A1 * 9/2013 Pizano .................... H04L 63/06 713/193
2014/0075204 A1 * 3/2014 Ramesh .................... H04L 9/14 713/189
2014/0359284 A1 * 12/2014 Pizano .................... H04L 63/06 713/165
2014/0380060 A1 12/2014 Ganguly
2015/0178515 A1 * 6/2015 Cooley ................. H04L 63/083 713/155
2015/0242657 A1 * 8/2015 Kim ........................ G06F 21/78 713/193
2015/0263857 A1 * 9/2015 Pizano .................. H04L 9/0816 713/186
2016/0021068 A1 * 1/2016 Jueneman ............. H04L 63/061 713/168
2016/0021109 A1 * 1/2016 Jueneman ............. H04L 9/3226 713/165
2016/0063256 A1 * 3/2016 Bhansali ............... G06F 21/602 713/2
2016/0063259 A1 * 3/2016 Bhansali ............... G06F 21/575 713/2
2016/0119138 A1 * 4/2016 Pizano .................. H04L 9/0816 380/44
2016/0204943 A1 * 7/2016 Pizano ................ G06F 21/6218 713/168
2016/0234174 A1 * 8/2016 Zizi ..................... H04L 63/0428
2016/0259927 A1 * 9/2016 Ho ...................... H04L 63/0861
2017/0141920 A1 * 5/2017 Herder, III ................ H04L 9/30
2017/0230179 A1 * 8/2017 Mannan ................ H04L 9/3226
2017/0302453 A1 * 10/2017 Pizano ................ G06F 21/6218
2018/0241728 A1 * 8/2018 Burgess ................ H04L 9/3215
2018/0330137 A1 * 11/2018 Moon ................... G06F 3/0446
2019/0334884 A1 * 10/2019 Ross ....................... G06F 21/41
2019/0356491 A1 * 11/2019 Herder, III ............ H04L 9/3242
2020/0028677 A1 * 1/2020 Herder, III .......... H04L 63/0861
2020/0396076 A1 * 12/2020 Herder, III ................ H04L 9/30
2021/0144008 A1 * 5/2021 Prager ................ G06V 40/1382
2022/0069991 A1 * 3/2022 Herder, III ............ H04L 9/3231
2022/0294631 A1 * 9/2022 Herder, III ................ H04L 9/30

(56) References Cited

U.S. PATENT DOCUMENTS

| | | | | |
|---|---|---|---|---|
| 2023/0162523 | A1* | 5/2023 | Moon | G06V 40/1306 382/125 |
| 2024/0022420 | A1* | 1/2024 | Herder, III | G06F 21/32 |
| 2024/0129119 | A1* | 4/2024 | Herder, III | H04L 9/0894 |
| 2025/0125954 | A1* | 4/2025 | Herder, III | H04L 9/0894 |

FOREIGN PATENT DOCUMENTS

| | | | |
|---|---|---|---|
| JP | 2009238156 | A | 10/2009 |
| JP | 2010226506 | A | 10/2010 |

* cited by examiner

MEMORY CONTROLLER, STORAGE DEVICE INCLUDING THE SAME, AND OPERATING METHOD OF THE MEMORY CONTROLLER

CROSS-REFERENCE TO RELATED APPLICATION

This application is a continuation of U.S. application Ser. No. 17/036,386, filed on Sep. 29, 2020, which claims the benefit of priority under 35 U.S.C. 119 of Korean Patent Application No. 10-2019-0153549, filed on Nov. 26, 2019, in the Korean Intellectual Property Office, the disclosure of each of which is incorporated herein in its entirety by reference.

BACKGROUND

Inventive concepts relate to a storage device, and more particularly, to a memory controller supporting self-encryption, a storage device including the memory controller, and an operating method of the memory controller.

As non-volatile memory, flash memory may retain data stored therein even when power thereto is cut off. Storage devices, such as solid state drives (SSDs) along with memory cards including flash memory are widely used. Recently, with the increasing demand for data security, a storage device supporting self-encryption to securely store data, such as important data requiring security, and to prevent and/or reduce the likelihood of data leakage even if the storage device is used after being discarded or stolen. A storage device may also support self-encryption based on biometric authentication.

SUMMARY

Inventive concepts provide a memory controller capable of encrypting and decrypting user data, which is stored in a memory device, based on biometric information provided from a biometric module/circuitry, a storage device including the memory controller, and/or an operating method of the memory controller.

According to an aspect of inventive concepts, there is provided a memory controller including processing circuitry configured to control an access right to a secure key based on a biometric authentication message and a unique value, the biometric authentication message and the unique value being received from an external device, and to encrypt data based on the secure key, the data being received from a host and being stored in a secure area of the non-volatile memory device, the processing circuitry further configured to decrypt encrypted data based on the secure key, the encrypted data being stored in the secure area of the non-volatile memory device.

According to another aspect of inventive concepts, there is provided a storage device including a non-volatile memory device including a first area and a second area, and processing circuitry configured to receive a first unique value and a biometric authentication result, the first unique value corresponding to a user's biometric information, and to encrypt first data and decrypt second data based on the first unique value, the first data being stored in the first area and the second data resulting from encryption and being read from the first area.

According to a further aspect of inventive concepts, there is provided an operating method of a memory controller controlling a non-volatile memory device, including receiving a unique value and a biometric authentication success message from an external device, the unique value corresponding to user's biometric information, decrypting an encrypted secure key based on the unique value, the encrypted secure key being stored in the processing circuitry, encrypting data based on a decrypted secure key, the data being received from a host, and transmitting encrypted data to the non-volatile memory device.

BRIEF DESCRIPTION OF THE DRAWINGS

Example embodiments of inventive concepts will be more clearly understood from the following detailed description taken in conjunction with the accompanying drawings in which.

DETAILED DESCRIPTION OF EXAMPLE EMBODIMENTS

Hereinafter, embodiments will be described in detail with reference to the accompanying drawings.

Figure 1:
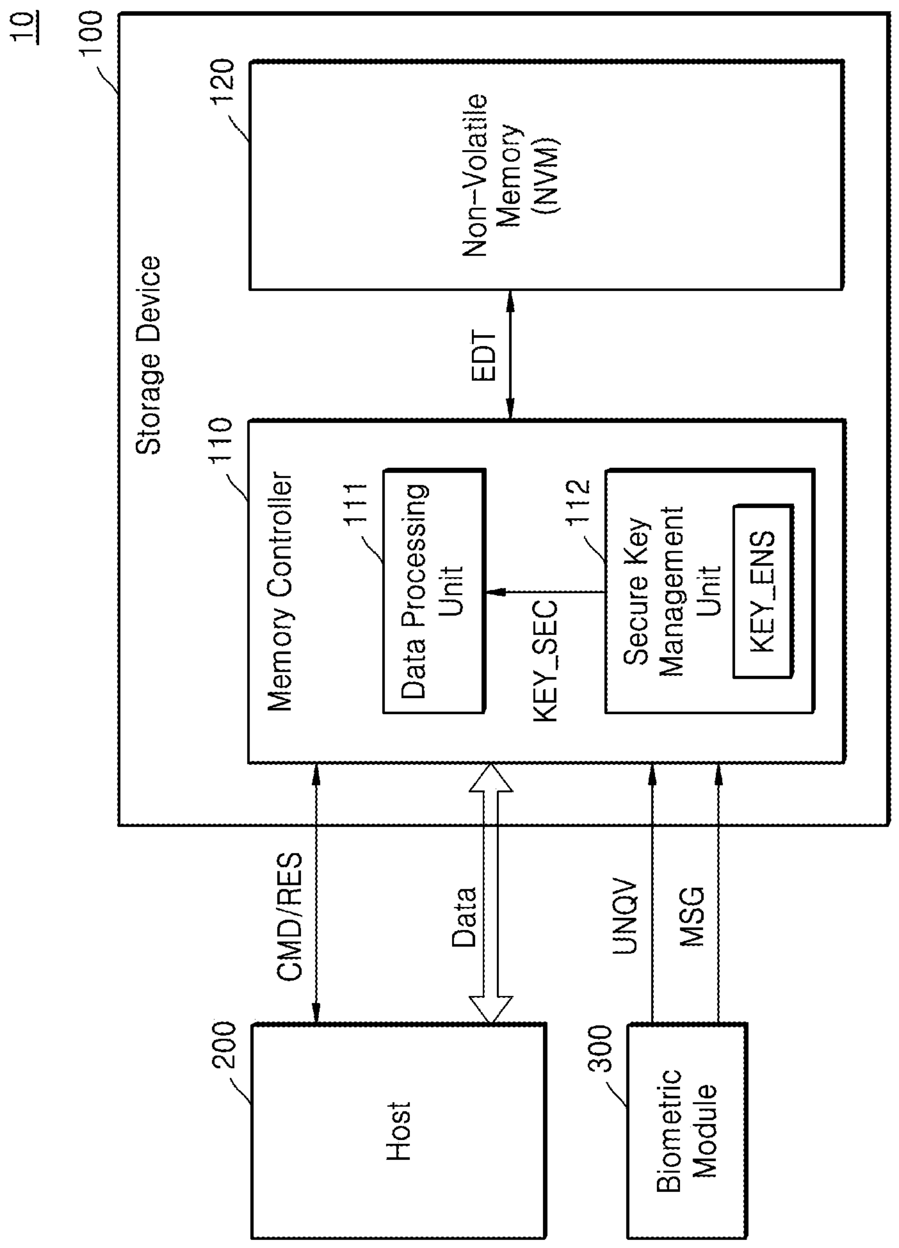
FIG. 1 is a block diagram of a storage system according to some example embodiments.

FIG. 1 is a block diagram of a storage system according to some example embodiments.

Referring to FIG. 1, a storage system 10 may include a storage device 100, a host 200, and a biometric module 300. The storage device 100 may include a memory controller 110 and a non-volatile memory device (NVM) 120.

For example, the storage system 10 may be embodied as at least one of a personal computer (PC), a data server, a network-attached storage, an Internet of things (IoT) device, or a portable electronic device. The portable electronic device may include a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

In some example embodiments, the storage device 100 may include internal memory embedded in an electronic device. For example, the storage device 100 may include an SSD, an embedded universal flash storage (UFS) memory device, or an embedded multimedia card (eMMC). In some example embodiments, the storage device 100 may include external memory mounted in a removable manner on an electronic device. For example, the storage device 100 may include a portable SSD, a UFS memory card, a compact flash (CF) card, a secure digital (SD) card, a micro-SD card, a mini-SD card, an extreme digital (xD) card, or a memory stick.

The host 200 may transmit a command CMD and/or data, which is stored in the non-volatile memory device 120, to the storage device 100, and may receive a response RES and/or data, which is read from the non-volatile memory device 120, from the storage device 100. For example, the host 200 may be embodied as and/or include an application processor (AP) and/or a system-on-a-chip (SoC). For example, the host 200 may be embodied as and/or include, but not limited to, an integrated circuit, a motherboard, and/or a database server.

The host 200 may communicate with the storage device 100 through various interfaces. In some example embodiments, the host 200 is electrically connected to the storage device 100 via a hot-pluggable interface using a cable.

The memory controller 110 may control all operations of the storage device 100. The memory controller 110 may write data to the non-volatile memory device 120 and/or read data from the non-volatile memory device 120 in response to the command CMD from the host 200. Hereinafter, data that is received from the host 200 and written to the non-volatile memory device 120 and/or read from the non-volatile memory device 120 and provided to the host 200 is referred to as user data.

The non-volatile memory device 120 may refer to and/or include a memory or a memory device, each characterized by retaining data stored therein after being powered down/powered off. Accordingly, even when power supply to the storage device 100 is interrupted, user data stored in the non-volatile memory device 120 may be retained. In some example embodiments, the non-volatile memory device 120 may include a flash memory device, e.g., a NAND flash memory device. In some example embodiments, the non-volatile memory device 120 may include a vertical NAND (VNAND) flash memory device having a three-dimensional (3D) array structure but is not limited thereto. For example, the non-volatile memory device 120 may include a resistive memory device such as resistive random access memory (ReRAM), phase-change RAM (PRAM), and/or magnetic RAM (MRAM). The non-volatile memory device 120 may include a magnetic disk device apart from a semiconductor memory device. For convenience of description below, it is assumed that the non-volatile memory device 120 includes a NAND flash memory device, but example embodiments are not limited thereto. In some example embodiments, the non-volatile memory device 120 may include a plurality of NVM chips, which may communicate with the memory controller 110 through a plurality of channels.

Considering the non-volatility of the non-volatile memory device 120 retaining data even after being powered off, it may be necessary and/or desirable to keep secure user data stored in the non-volatile memory device 120. For example, when the storage device 100 is reused and/or discarded, and/or is used by an unauthorized user, it is necessary/desirable to prevent or reduce the likelihood of the release of user data requiring security, which is stored in the storage device 100 (e.g., the non-volatile memory device 120). To prevent/reduce the likelihood of the release of the user data, the storage device 100 may support self-encryption. The storage device 100 may encrypt and store user data in the non-volatile memory device 120. The user data stored in the non-volatile memory device 120 is kept encrypted, and therefore, even when power supply to the storage device 100 is interrupted, the user data may be kept secured. The storage device 100 supporting self-encryption as described above may be referred to as a self-encrypting device or self-encrypting drive (SED).

The memory controller 110 may encrypt and/or decrypt user data based on a unique value UNQV received from the biometric module 300. In some example embodiments, the memory controller 110 may encrypt and decrypt user data based on a user password (and/or a host key) received from the host 200 and, may encrypt and decrypt the user data based on the unique value UNQV, which is received from the biometric module 300 in the case of successful biometric authentication, even when the user password is not received from the host 200.

In detail, the memory controller 110 may encrypt and/or decrypt user data in real time based on a secure key KEY_SEC (and/or an encryption and decryption key). At this time, to prevent/reduce the chance of an unauthorized user from accessing the secure key KEY_SEC, the memory controller 110 may encrypt and/or decrypt the secure key KEY_SEC based on the unique value UNQV.

For example, in a stage of registering a user's biometric information, the memory controller 110 may receive a biometric information registration message and the unique value UNQV, which is generated based on the registered biometric information, from the biometric module 300, may encrypt the secure key KEY_SEC based on the unique value UNQV, and may store an encrypted secure key KEY_ENS. Thereafter, when the storage device 100 is reconnected to the host 200 after being disconnected from the host 200 and/or powered off or is connected to another host, e.g., when a write and/or read right to the non-volatile memory device 120 is requested, the memory controller 110 may receive a message MSG and the unique value UNQV from the biometric module 300 and perform user authentication based on the unique value UNQV when the message MSG indicates successful biometric authentication. When the user authentication is successful, the memory controller 110 may obtain an access right to the secure key KEY_SEC by decrypting the encrypted secure key KEY_ENS based on the unique value UNQV and may set the non-volatile memory device 120 to an unlocked state. When the non-volatile memory device 120 is in the unlocked state, an access, e.g., a write and/or a read access, may be performed with respect to a secure area of the non-volatile memory device 120. The memory controller 110 may access the non-volatile memory device 120 by encrypting and/or decrypting user data based on the secure key KEY_SEC. The memory controller 110 may include a data processing unit 111 and a secure key management unit 112. The data processing unit 111 may encrypt and/or decrypt user data. The data processing unit 111 may encrypt data, which is received from the host 200, based on the secure key KEY_SEC and store encrypted data in the non-volatile memory device 120. The data processing unit 111 may decrypt the encrypted data, which is read from the non-volatile memory device 120, based on the secure key KEY_SEC and may transmit decrypted data to the host 200. The secure key KEY_SEC may be generated based on a random attribute key generated by a hardware logic of the storage device 100, and/or based on a combination of the random attribute key and a unique key provided from an external device (e.g., the host 200). In some example embodiments, one secure key KEY_SEC may be generated for the entire secure area of the non-volatile memory device

120, or, alternatively different secure keys KEY_SEC may be respectively generated for a plurality of portions of the secure area of the non-volatile memory device 120.

The secure key management unit 112 may control an access to the secure key KEY_SEC. When the memory controller 110 obtains an access to the secure key KEY_SEC, the non-volatile memory device 120 may be set to an unlocked state.

The secure key management unit 112 may set an access right (which may be referred to as a user authority) for the secure key KEY_SEC and/or perform access right authentication (or referred to as user authentication) based on the message MSG and the unique value UNQV, which are received from the biometric module 300. In some example embodiments, the secure key management unit 112 may control an access to the secure key KEY_SEC based on the unique value UNQV or a user password provided from the host 200.

In some example embodiments, a plurality of items of biometric information may be registered in the biometric module 300. The secure key management unit 112 may receive a plurality of unique values UNQV corresponding to the respective items of biometric information from the biometric module 300. The secure key management unit 112 may encrypt a secure key, e.g., one secure key KEY_SEC, based on the unique values UNQV, and may generate and store a plurality of encrypted secure keys KEY_ENS. Thereafter, during user authentication, the secure key management unit 112 may obtain an access right to the secure key KEY_SEC by decrypting an encrypted secure key KEY_ENS corresponding to a unique value UNQV, which is received, among the encrypted secure keys KEY_ENS and may set the non-volatile memory device 120 to an unlocked state.

At this time, the secure key management unit 112 may receive the message MSG, which indicates successful biometric authentication and which includes an index of the unique value UNQV (or biometric information represented by the unique value UNQV), from the biometric module 300, find the encrypted secure key KEY_ENS corresponding to the unique value UNQV among the encrypted secure keys KEY_ENS, and decrypt the encrypted secure key KEY_ENS based on the unique value UNQV. Alternatively, when storing each of the encrypted secure keys KEY_ENS, the secure key management unit 112 may store an encoding value, which is generated by encoding (or hashing) the unique value UNQV and a random value (e.g. a "salt" value), together with an encrypted secure key KEY_ENS corresponding to the encoding value. Thereafter, when receiving the message MSG indicating successful biometric authentication and the unique value UNQV during user authentication, the secure key management unit 112 may generate an authentication encoding value by encoding the unique value UNQV and the random value, and may find the encrypted secure key KEY_ENS corresponding to the unique value UNQV among the encrypted secure keys KEY_ENS by comparing the authentication encoding value with the encoding value stored therein.

The biometric module 300 may obtain biometric data by sensing a user's body, convert the biometric data into biometric information based on a predefined (or, alternatively, variable) data format, and store and manage the biometric information. The biometric module 300 may store biometric information of each of a plurality of users, who have been registered as authorized, in NVM included therein. The biometric module 300 may generate the unique value UNQV according to the biometric information and transmit the message MSG and the unique value UNQV to the memory controller 110. During biometric information registration, the biometric module 300 may transmit the message MSG, indicating a biometric information registration and the unique value UNQV to the memory controller 110. When the memory controller 110 receives the message MSG, and the message MSG indicates the biometric information registration, the memory controller 110 may set a user authority based on the unique value UNQV.

Thereafter, when biometric information based on obtained biometric data matches biometric information stored in advance in the biometric module 300, the biometric module 300 may generate the unique value UNQV based on the biometric information, and may transmit the message MSG indicating successful biometric authentication and the unique value UNQV to the memory controller 110. The memory controller 110 may perform user authentication based on the unique value UNQV in response to the message MSG indicating successful biometric authentication.

As described above, the biometric module 300 may obtain biometric information or perform biometric authentication by sensing a user's body, store and manage the biometric information, and generate and provide the unique value UNQV corresponding to the biometric information to the memory controller 110 together with a biometric authentication message. The biometric module 300 may be separate and distinct from the storage device 100. For example, the biometric module 300 may be on a different chip, and/or on a different SSD component, and/or on a different PCB, from that of the storage device 100.

The biometric module 300 may include a recognition module, such as a fingerprint recognition module, an iris recognition module, a face recognition module, a vein recognition module, and/or a voice recognition module, which may obtain a user's biometric data.

For example, a fingerprint recognition module may obtain a fingerprint image as biometric data by scanning a user's fingerprint, and may convert the fingerprint image into fingerprint information based on a predefined format. During biometric information registration, the fingerprint recognition module may store the fingerprint information in the internal NVM thereof. The fingerprint recognition module may store fingerprint information of each of a plurality of users. The fingerprint recognition module may generate the unique value UNQV based on the fingerprint information and transmit the unique value UNQV and a fingerprint information registration message to the memory controller 110.

Thereafter, during user authentication, the fingerprint recognition module may obtain a fingerprint image by scanning a user's fingerprint, and may convert the fingerprint image into fingerprint information. The fingerprint recognition module may compare the fingerprint information with one stored therein and may generate the unique value UNQV based on the fingerprint information when there is the same fingerprint information therein, for example, when the fingerprint information matches the one stored therein. The fingerprint recognition module may transmit the message MSG indicating successful biometric authentication and the unique value UNQV to the memory controller 110.

In some example embodiments, the memory controller 110 and the storage device 100 including the same may receive the unique value UNQV corresponding to user's biometric information and a biometric authentication result from the biometric module 300, and may perform authentication on the secure key KEY_SEC based on the unique value UNQV. In other words, the memory controller 110 may encrypt and decrypt user data based on the unique value UNQV received from the biometric module 300.

When the memory controller 110 performs biometric authentication or stores and manage biometric information in the case where user authority setting and user authentication are performed based on a user's biometric information, the load of the memory controller 110 may increase. However, in the storage system 10 according to the embodiments described above, the biometric module 300 may store and manage biometric information, and generate and provide the unique value UNQV corresponding to the biometric information to the memory controller 110 so that the memory controller 110 may perform user authority setting and user authentication based on the biometric information. Accordingly, the memory controller 110 may have less load, and/or safely store and/or manage user data.

Figure 2A:
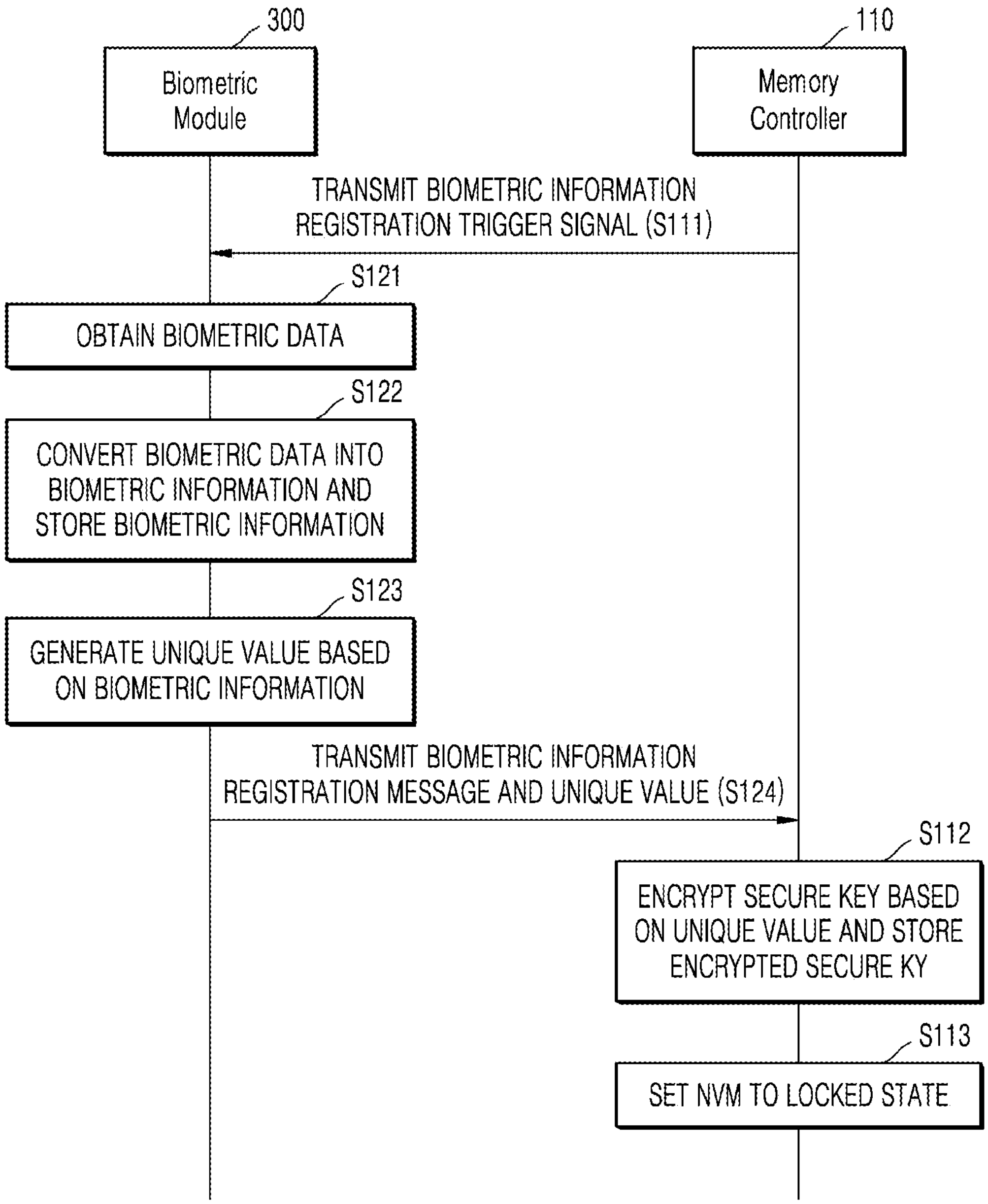
FIGS. 2A and 2B are flowcharts of operating methods of a memory controller and a biometric module, respectively, according to example embodiments.
Figure 2B:
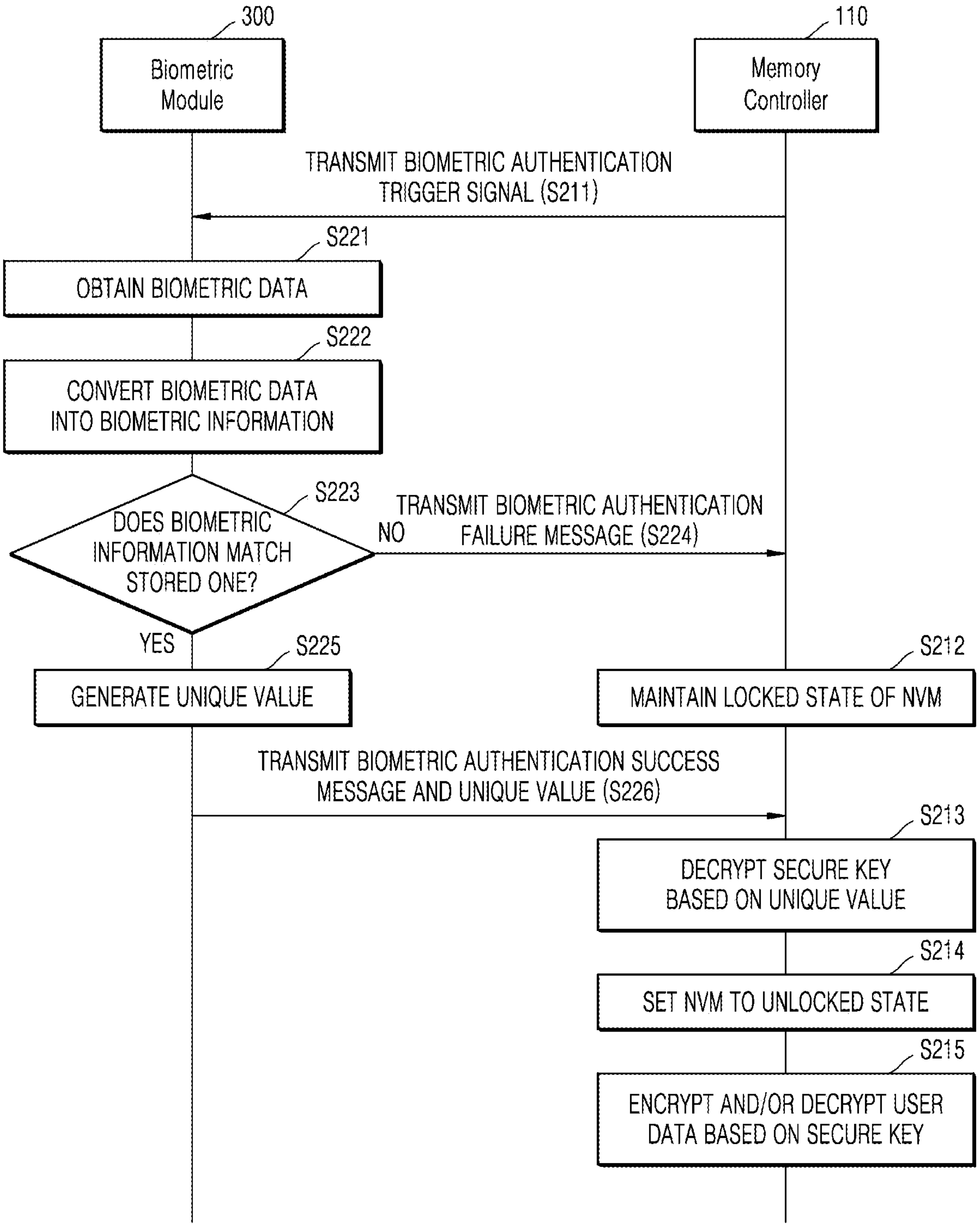

FIGS. 2A and 2B are flowcharts of methods of operating a memory controller and a biometric module, according to example embodiments. FIG. 2A shows a method of registering biometric information, and FIG. 2B shows a method of authenticating a user based on biometric information. The methods of FIGS. 2A and 2B may be performed in a state where a storage device including a memory controller, e.g., the storage device 100 in FIG. 1, is physically connected to a host, e.g., the host 200 in FIG. 1.

Referring to FIG. 2A, the memory controller 110 may transmit a biometric information registration trigger signal to the biometric module 300 in operation S111. In some example embodiments, the memory controller 110 may transmit the biometric information registration trigger signal to the biometric module 300 in response to a request (e.g., a biometric information registration request command) received from the host 200 (in FIG. 1).

The biometric module 300 may obtain biometric data in operation S121. The biometric module 300 may obtain the biometric data by sensing a user's body. For example, when the biometric module 300 includes a fingerprint recognition module, the fingerprint recognition module may sense a user's fingerprint and obtain a fingerprint image.

The biometric module 300 may convert the biometric data into biometric information, and may store the biometric information in operation S122. For example, the fingerprint recognition module may convert the fingerprint image into fingerprint information based on a predefined (or, alternatively, variable) data format. For example, the fingerprint information may include a characteristic of the user's fingerprint. The fingerprint information may include information about the distance between feature points and/or positions of the feature points, the distance between a ridge and a valley of the fingerprint, or the extension direction of the ridge or the valley. However, example embodiments are not limited thereto, and the fingerprint image, for example, portions and/or an entirety of the fingerprint image, may be stored intact as the fingerprint information.

The biometric module 300 may generate a unique value based on the biometric information in operation S123. For example, the fingerprint recognition module may generate the unique value indicating the user based on the user's fingerprint information.

Thereafter, the biometric module 300 may transmit a biometric information registration message and the unique value to the memory controller 110 in operation S124.

When the memory controller 110 receives the biometric information registration message, the memory controller 110 may encrypt a secure key based on the unique value received together with the biometric information registration message and store an encrypted secure key in operation S112. In other words, the memory controller 110 may perform user authority setting based on the unique value. The memory controller 110 may set the unique value as a credential value (e.g., a user password) for a user's authority. The memory controller 110 may encrypt the secure key based on the unique value and store the encrypted secure key in the internal NVM included therein.

When the encrypted secure key is stored, the memory controller 110 may set the non-volatile memory device 120 (in FIG. 1) to a locked state in operation S113. The non-volatile memory device 120 may include a secure area, in which encrypted user data is stored, and a non-secure area (e.g., a predefined and/or variable reserved area). When the non-volatile memory device 120 is in the locked state, an access to the secure area, i.e., a read from and/or a write to the secure area, may be restricted. However, an access to the non-secure area may not be restricted. For example, the host 200 may read data from the non-secure area. The memory controller 110 may maintain the non-volatile memory device 120 in the locked state until user authentication is successful.

Referring to FIG. 2B, the memory controller 110 may transmit a biometric authentication trigger signal to the biometric module 300 in operation S211. In some example embodiments, when the memory controller 110 is electrically connected to the host 200 or another host or when the memory controller 110 is communicatively relinked to the host 200, the memory controller 110 may transmit the biometric authentication trigger signal to the biometric module 300. Alternatively, the memory controller 110 may transmit the biometric authentication trigger signal to the biometric module 300 in response to a request (e.g., a biometric authentication request command) of the host 200.

The biometric module 300 may obtain biometric data by sensing a user's body in operation S221, and may convert the biometric data into biometric information in operation S222. Operations S221 and S222 may be the same as or similar to operations S121 and 122.

The biometric module 300 may determine whether the biometric information matches one stored therein, e.g., the biometric information stored in operation S122 in FIG. 2A, in operation S223. The biometric module 300 may perform biometric authentication by comparing the biometric information with one stored therein in advance. When a plurality of items of biometric information have been stored in the biometric module 300, the biometric module 300 may determine whether there is any, e.g. at least one, item of biometric information, which matches the biometric information, among the items of biometric information.

When the biometric information does not match the one stored in the biometric module 300, the biometric module 300 may transmit a biometric authentication failure message to the memory controller 110.

When the biometric information matches the one, or at least one, stored in the biometric module 300, the biometric module 300 may generate a unique value based on the biometric information in operation S225 and may transmit a biometric authentication success message and the unique value to the memory controller 110 in operation S226.

When the memory controller 110 receives the biometric authentication failure message, the memory controller 110 may determine that the user authentication fails and may maintain the locked state of the non-volatile memory device 120 in operation S212.

When the memory controller 110 receives the biometric authentication success message, the memory controller 110 may decrypt a secure key based on the unique value in operation S213. In other words, the memory controller 110 decrypt the secure key, which has been encrypted based on the unique value in operation S112 in FIG. 2A, based on the currently received unique value.

The memory controller 110 may set the non-volatile memory device 120 to an unlocked state in operation S214, and may encrypt and/or decrypt user data based on the secure key in operation S215. For example, the memory controller 110 may access the secure area of the non-volatile memory device 120 in response to a command from the host 200.

When the storage device 100 is disconnected from the host 200 or powered off, the memory controller 110 may set the non-volatile memory device 120 to the locked state.

Figure 3:
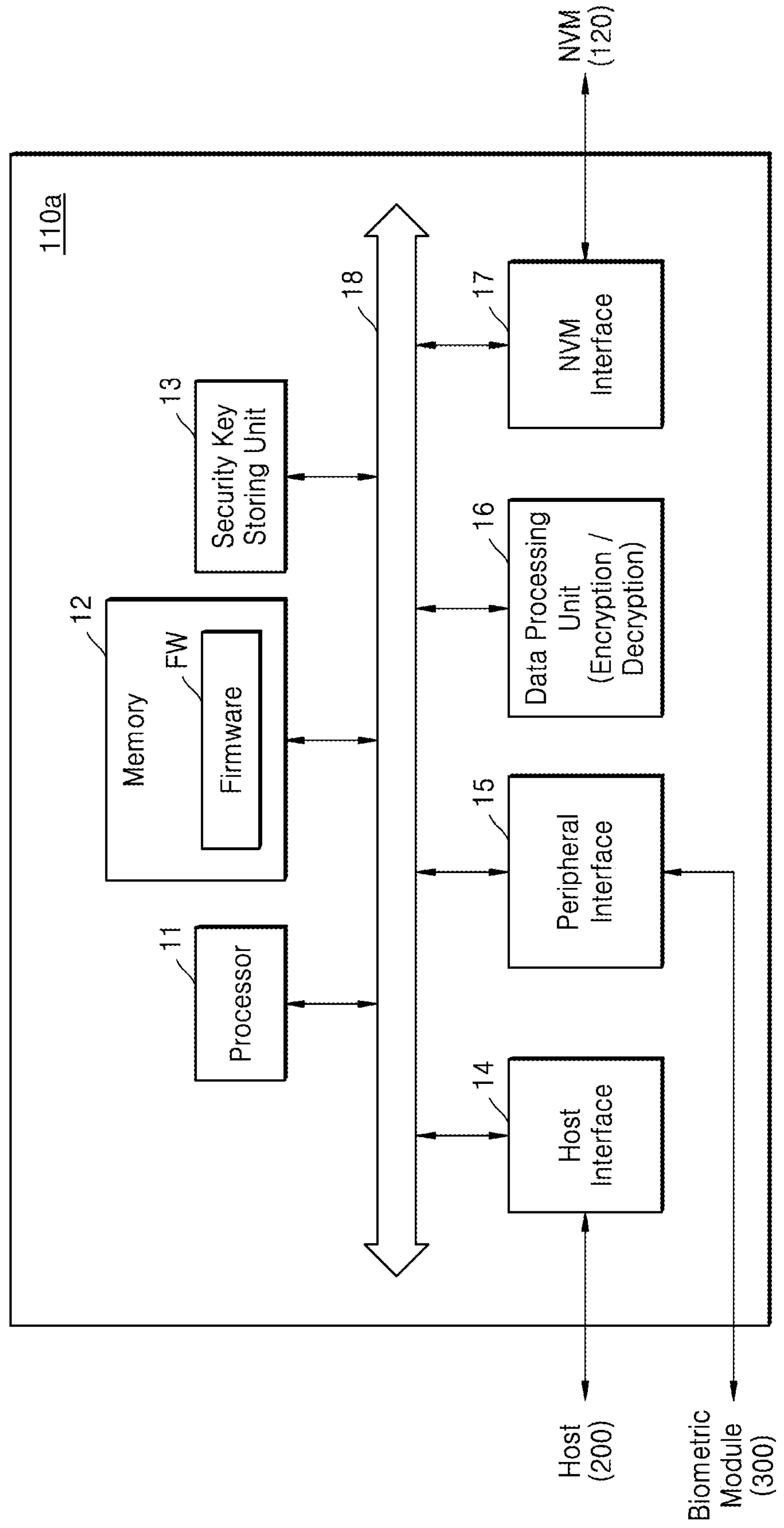
FIG. 3 is a block diagram of an example of a memory controller, according to some example embodiments.

FIG. 3 is a block diagram of an example of a memory controller, according to some example embodiments.

Referring to FIG. 3, a memory controller 110*a* may include processing circuitry, e.g. a processor 11, a memory 12, a secure key storing unit 13, a host interface 14, a peripheral interface 15, a data processing unit 16, and a non-volatile memory interface 17 (hereinafter, referred to as an NVM interface 17). In some example embodiments, the components, e.g., the processor 11, the memory 12, the secure key storing unit 13, the host interface 14, the peripheral interface 15, the data processing unit 16, and the NVM interface 17, of the memory controller 110*a* may communicate with one another through a system bus 18. In some example embodiments, the memory controller 110*a* may further include other components, e.g., read-only memory (ROM), an error correction circuit, and buffer. In some example embodiments, components of the memory controller 110*a* may be fully integrated with one another, and/or some or all functions of one of the components may be performed by other components.

The processor 11 may include a central processing unit (CPU) and/or a microprocessor and may control all operations of the memory controller 110*a*. In some example embodiments, the processor 11 may include a multi-core processor, e.g., a dual-core processor or a quad-core processor.

The memory 12 may include volatile memory, such as dynamic RAM (DRAM) or static RAM (SRAM), or non-volatile memory and may be loaded with firmware FW. The firmware FW may include program code as which an operation algorithm, e.g., a secure key management algorithm, of the memory controller 110, which has been described above with reference to FIGS. 2A and 2B, is embodied. The firmware FW may be stored in non-volatile memory, e.g., ROM, electrically erasable programmable ROM (EEPROM), PRAM, or flash memory, inside or outside the memory controller 110*a*, and/or may be stored in the non-volatile memory device 120 and, when the storage device 100 (in FIG. 1) is powered on, may be loaded to the memory 12.

A combination of the processor 11 and the firmware FW may be embodied as or correspond to the secure key management unit 112. For example, when the processor 11 executes the firmware FW, the function of the secure key management unit 112, which has been described with reference to FIG. 1, may be performed. The processor 11 may encrypt a secure key based on a unique value received from the biometric module 300 according to the secure key management algorithm and store an encrypted secure key in the secure key storing unit 13 and/or may decrypt the encrypted secure key based on the unique value. However, embodiments are not limited thereto. The secure key management unit 112 may be implemented by a hardware module and/or software.

The secure key storing unit 13 may store an encrypted secure key. The secure key storing unit 13 may store a plurality of secure keys respectively encrypted based on a plurality of unique values. The secure key storing unit 13 may include non-volatile memory such as a register, PRAM, and/or flash memory.

The host interface 14 may provide an interface between the host 200 and the memory controller 110*a*. For example, the host interface 14 may provide an interface according to universal serial bus (USB), multimedia card (MMC), peripheral component interconnect express (PCIExpress), advanced technology attachment (ATA), serial ATA (SATA), parallel ATA (PATA), small computer system interface (SCSI), serial attached SCSI (SAS), enhanced small disk interface (ESDI), integrated drive electronics (IDE), or the like.

The peripheral interface 15 may provide an interface between the memory controller 110*a* and the biometric module 300. For example, the peripheral interface 15 may provide a communication interface such as a universal asynchronous receiver transmitter (UART) interface, an inter-integrated circuit (I2C) interface, a serial peripheral interface (SPI), a mobile industry processor interface (MIPI), or an embedded display port (eDP) interface.

The peripheral interface 15 may transmit a biometric information registration trigger signal or a biometric authentication trigger signal to the biometric module 300. The peripheral interface 15 may receive a biometric authentication message and a unique value from the biometric module 300. For example, a biometric information registration message or a biometric authentication result message (e.g., a biometric authentication failure message or a biometric authentication success message) may be received as the biometric authentication message.

The data processing unit 16 may encrypt and/or decrypt user data. The data processing unit 111 described with reference to FIG. 1 may be applied to the data processing unit 16 in FIG. 3. The data processing unit 16 may perform encryption or decryption on user data based on a secure key. The data processing unit 16 may perform encryption on user data received from the host 200 based on a secure key. For example, the data processing unit 16 may scramble the user data based on the secure key. Encrypted user data may be transmitted to and stored in the non-volatile memory device 120. The data processing unit 16 may perform decryption on the encrypted user data, which is read from the non-volatile memory device 120, based on the secure key. For example, the data processing unit 16 may descramble the encrypted user data based on the secure key. Decrypted user data may be transmitted to the host 200.

The NVM interface 17 may provide an interface between the memory controller 110*a* and the non-volatile memory device 120. Encrypted user data may be transmitted and/or received between the memory controller 110*a* and the non-volatile memory device 120 through the NVM interface 17. In some example embodiments, the number of NVM interfaces 17 may correspond to the number of non-volatile memory chips included in the storage device 100 or the number of channels between the memory controller 110*a* and the non-volatile memory device 120.

Figure 4:
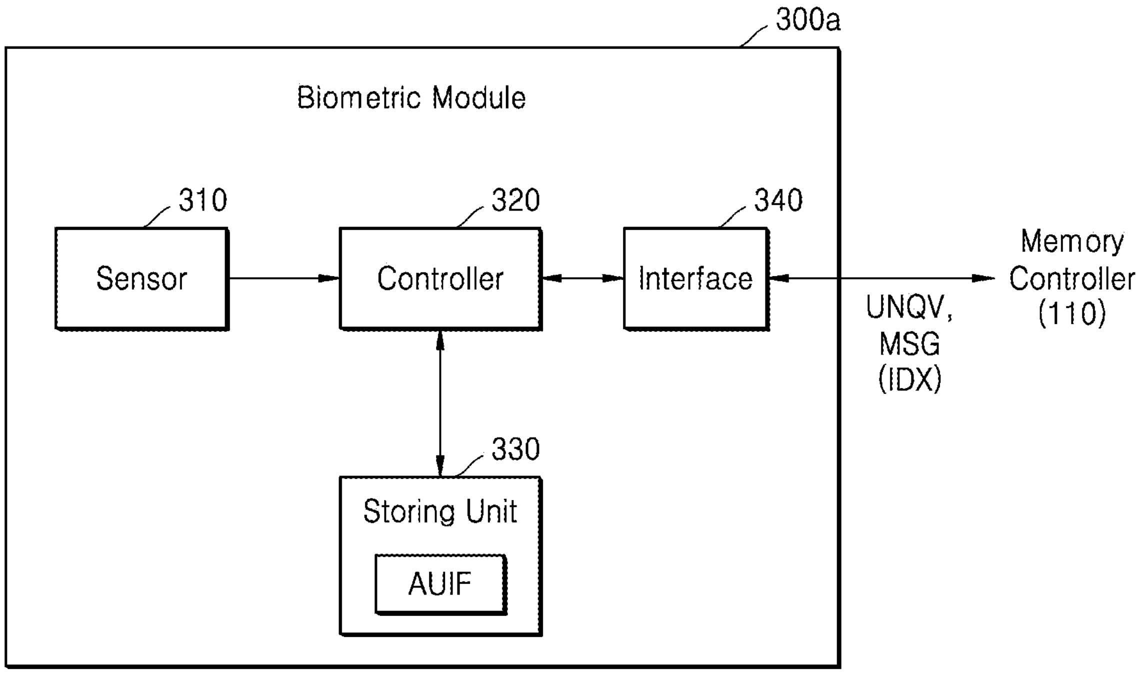
FIG. 4 is a block diagram of an example of a biometric module, according to some example embodiment.

FIG. 4 is a block diagram of an example of a biometric module, according to an example embodiment.

Referring to FIG. 4, a biometric module 300*a* may include a sensor 310, a controller 320, a storing unit 330, and an interface 340.

The sensor 310 may obtain biometric data by sensing a user's body. For example, when the sensor 310 includes a fingerprint sensor, the fingerprint sensor may generate or obtain a fingerprint image by sensing a user's fingerprint.

The controller 320 may generate, store, and manage biometric information AUIF and may perform biometric authentication. The controller 320 may convert biometric data into a template data, i.e., the biometric information AUIF, based on a predefined data format. During biometric information registration, the controller 320 may store the biometric information AUIF in the storing unit 330. The storing unit 330 may include non-volatile memory and may retain the biometric information AUIF even when power supplied to the biometric module 300*a* is cut off. When biometric information registration is performed with respect to a plurality of users, the storing unit 330 may store a plurality of items of biometric information AUIF. Individual components of the biometric module 300*a* may be integrated with one another. One or more functions performed by one or more of the biometric module 300*a* may be performed by other components of the biometric module 300*a*.

During biometric authentication, the controller 320 may compare biometric information (referred to as current biometric information), which is currently obtained by sensing a user's body, with the biometric information AUIF stored in the storing unit 330, and may determine matching or non-matching. When one of the items of biometric information AUIF in the storing unit 330 matches the current biometric information, the controller 320 may determine that the biometric authentication is successful. The controller 320 may include additional processing circuitry, such as an additional second processor.

The controller 320 may also generate the unique value UNQV based on biometric information. For example, the controller 320 may encode the biometric information AUIF and generate the unique value UNQV. The unique value UNQV may have a data format, which may be recognized by the biometric module 300*a* and the memory controller 110. For example, the unique value UNQV may include several tens of bytes (e.g., 32 bytes) of hash data.

The controller 320 may generate the unique value UNQV based on biometric information, e.g., registered biometric information, which is stored in the storing unit 330 during biometric information registration. The controller 320 may transmit the message MSG, which indicates registration of biometric information, and the unique value UNQV, which is generated based on the registered biometric information, to the memory controller 110 through the interface 340.

During biometric authentication, when biometric information obtained based on biometric data received from the sensor 310 matches the registered biometric information stored in the storing unit 330, the controller 320 may generate the unique value UNQV based on the obtained biometric information. The controller 320 may transmit the message MSG, which indicates successful biometric authentication, and the unique value UNQV, which is generated based on the obtained biometric information, to the memory controller 110 through the interface 340. In some example embodiments, when a plurality of items of biometric information AUIF are registered, for example, when a plurality of items of fingerprint information are generated based on fingerprints of a plurality of users and/or based on different fingerprints of a user and stored in the storing unit 330, the controller 320 may transmit, together with the unique value UNQV, the message MSG including an index IDX of an item of biometric information AUIF (or an object of the item of biometric information AUIF), which is represented by the unique value UNQV among the items of biometric information AUIF, to the memory controller 110. During biometric information registration, the controller 320 may generate the message, which includes a biometric information registration signal and the index IDX indicating the biometric information AUIF (e.g., registered biometric information) corresponding to the unique value UNQV, and may transmit the unique value UNQV and the message MSG to the memory controller 110. During biometric authentication, the controller 320 may transmit the unique value UNQV and the message MSG, which includes a biometric authentication success signal and the index IDX indicating an item of biometric information AUIF that matches obtained biometric information among a plurality of registered items of biometric information AUIF, to the memory controller 110.

When a plurality of items of biometric information AUIF are registered in the biometric module 300*a*, a plurality of unique values UNQV based on the items of biometric information AUIF may be transmitted to the memory controller 110, and the memory controller 110 may store a plurality of encrypted secure keys, which are respectively generated based on the unique values UNQV. At this time, the memory controller 110 may identify an encrypted secure key, which corresponds to a unique value UNQV received together with the index IDX from the biometric module 300*a*, among the encrypted secure keys based on the index IDX.

The controller 320 may be implemented by a combination of processing circuitry/a processor, such as a micro controller unit (MCU) or a CPU, and firmware or by a hardware logic, such as a field programmable gate array (FPGA), an application specific integrated circuit (ASIC), or a complex programmable logic device (CPLD).

The interface 340 may receive a trigger signal, e.g., a biometric information registration trigger signal or a biometric authentication trigger signal, from the memory controller 110 and may transmit the message MSG related to biometric authentication and the unique value UNQV to the memory controller 110. For example, the interface 340 may provide a communication interface such as a UART interface, an I2C interface, an SPI, a MIPI, or an eDP interface.

Figure 5:
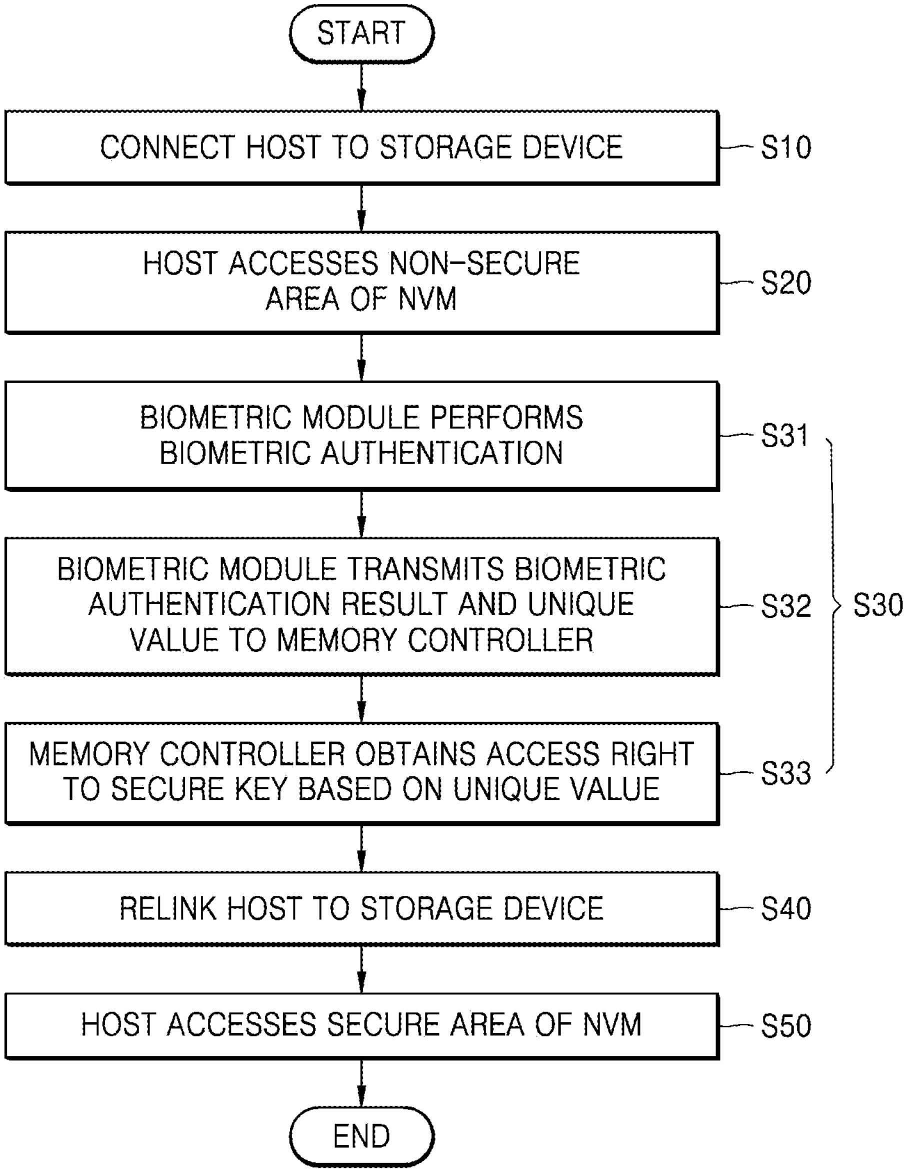
FIG. 5 is a flowchart of an operating method of a storage system, according to some example embodiment.
Figure 6:
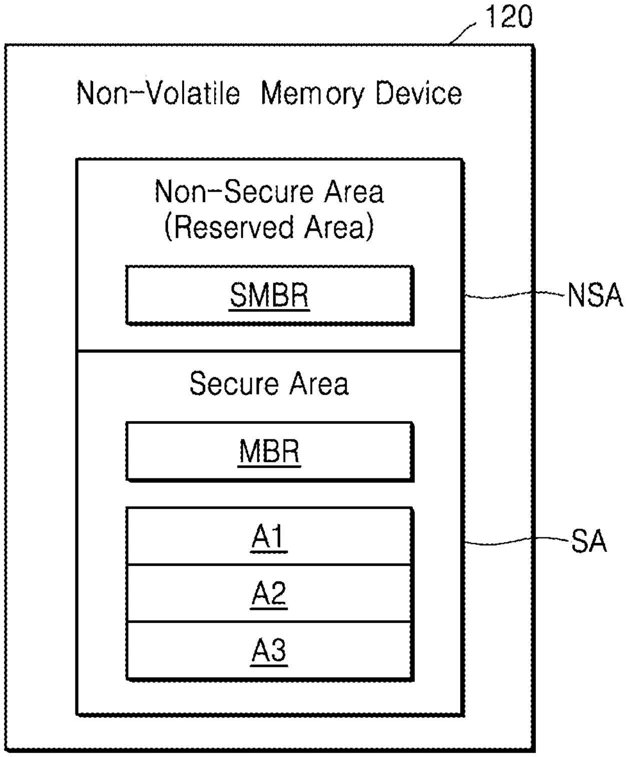
FIG. 6 is a block diagram of a non-volatile memory device.

FIG. 5 is a flowchart of an operating method of a storage system, according to some example embodiments. FIG. 6 is a block diagram of a non-volatile memory device. The operating method of FIG. 5 may be performed by the storage system 10 of FIG. 1. Accordingly, FIG. 1 is also referred to in description below.

Referring to FIGS. 1 and 5, the host 200 may be connected to the storage device 100 in operation S10. The host 200 may be physically and/or wirelessly connected to the storage device 100. For example, the host 200 may be electrically connected to the storage device 100 through a communication cable and may provide power to the storage device 100 through a power line.

The host 200 may access a non-secure area of the non-volatile memory device 120 in operation S20. Referring to FIG. 6, the non-volatile memory device 120 may include a secure area SA and a non-secure area NSA. As a predefined particular area, the non-secure area NSA may be referred to as a reserved area. The secure area SA is an area in which encrypted user data is stored. The secure area SA may be referred to as a user area and divided into a plurality of user areas (e.g., a plurality of partitions or volumes), e.g., first through third areas A1, A2, and A3.

The non-secure area NSA may be accessed by the host 200 regardless of a user authority. The secure area SA may be accessed by the host 200 when user authentication is successful. Because user authentication is not performed in an initial state of the connection between the storage device 100 and the host 200, the non-volatile memory device 120 may be in a locked state.

A shadow master boot record (SMBR) stored in the non-secure area NSA may be loaded to the memory controller 110. The host 200 may read data from the non-secure area NSA based on information included in the SMBR. For example, software supporting user configuration may be stored in the non-secure area NSA. In some example embodiments, the software may support self-encryption. When the host 200 reads and executes the software, the user configuration may be performed between the host 200 and the storage device 100.

According to the user configuration, user authentication may be performed in operation S30. As described above with reference to FIG. 2B, the biometric module 300 may perform biometric authentication in response to a biometric authentication trigger signal from the memory controller 110 in operation S31. The biometric module 300 may transmit a biometric authentication result and the unique value UNQV to the memory controller 110 in operation S32. When the biometric authentication is successful, the biometric module 300 may generate the unique value UNQV and may transmit a biometric authentication success message and the unique value UNQV to the memory controller 110.

When the memory controller 110 receives the biometric authentication success message, the memory controller 110 may obtain an access right to a secure key based on the unique value UNQV in operation S33. For example, the memory controller 110 may decrypt an encrypted secure key based on the unique value UNQV. The memory controller 110 may also set the non-volatile memory device 120 to an unlocked state.

When the non-volatile memory device 120 is in the unlocked state, areas of the non-volatile memory device 120 that may be recognized by the host 200 may be changed. For example, a master boot record (MBR) stored in the secure area SA may be loaded to the memory controller 110. The MBR may include information (e.g., partition information) about the user areas, i.e., the first through third areas A1, A2, and A3, of the secure area SA.

The host 200 may be relinked to the storage device 100 in operation S40. The host 200 may access the secure area SA of the non-volatile memory device 120, which is recognized by the host 200, in operation S50. In other words, the host 200 may transmit a command, which requests a write to and/or a read from a secure area undergone user authentication, to the memory controller 110. The memory controller 110 may encrypt data to be stored in the secure area based on a secure key and store encrypted data, and/or may decrypt user data read from the secure area based on the secure key and transmit decrypted user data to the host 200.

Figure 7A:
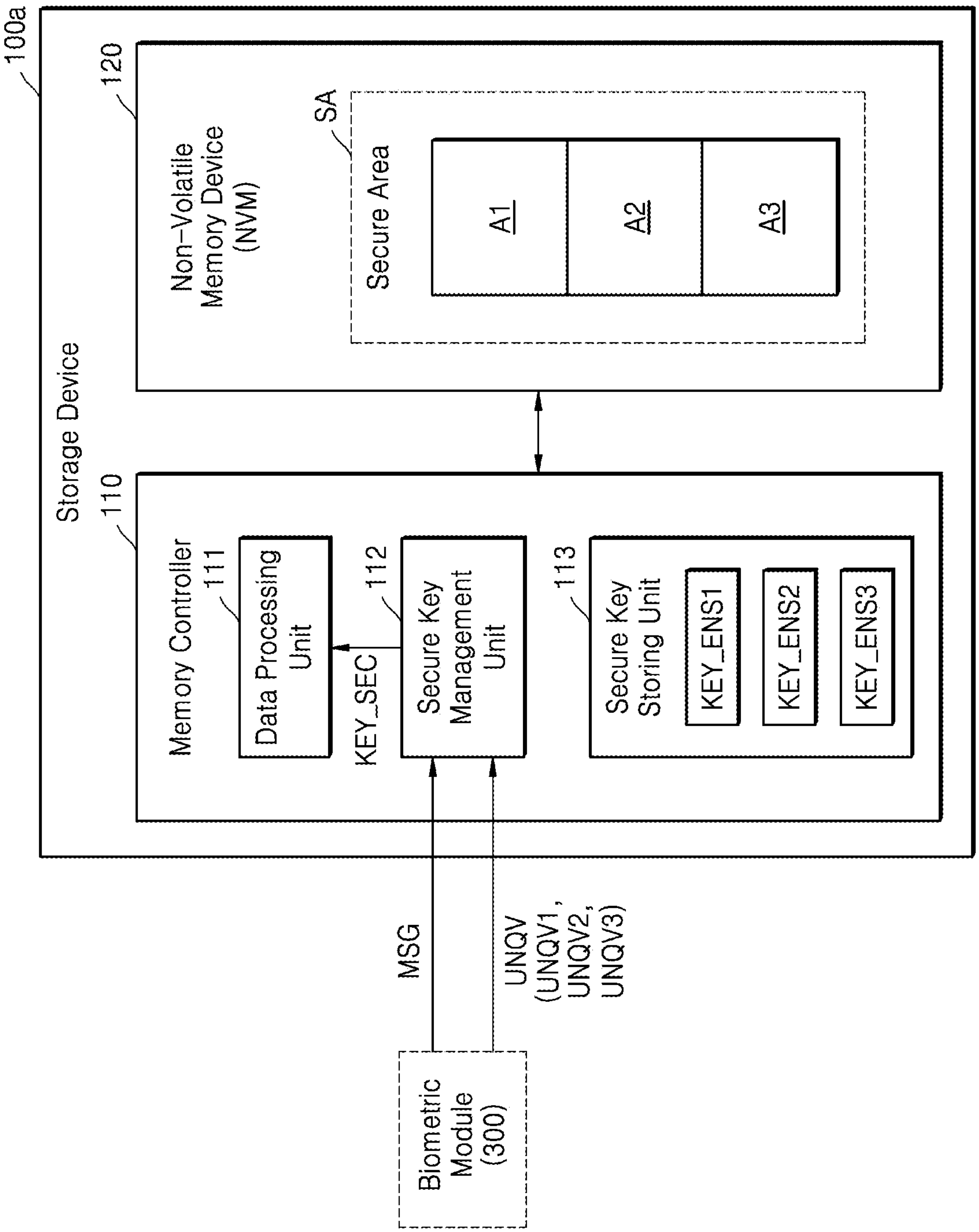
FIGS. 7A and 7B are diagrams for describing an example of an operating method of a storage device, according to an example embodiment.
Figure 7B:
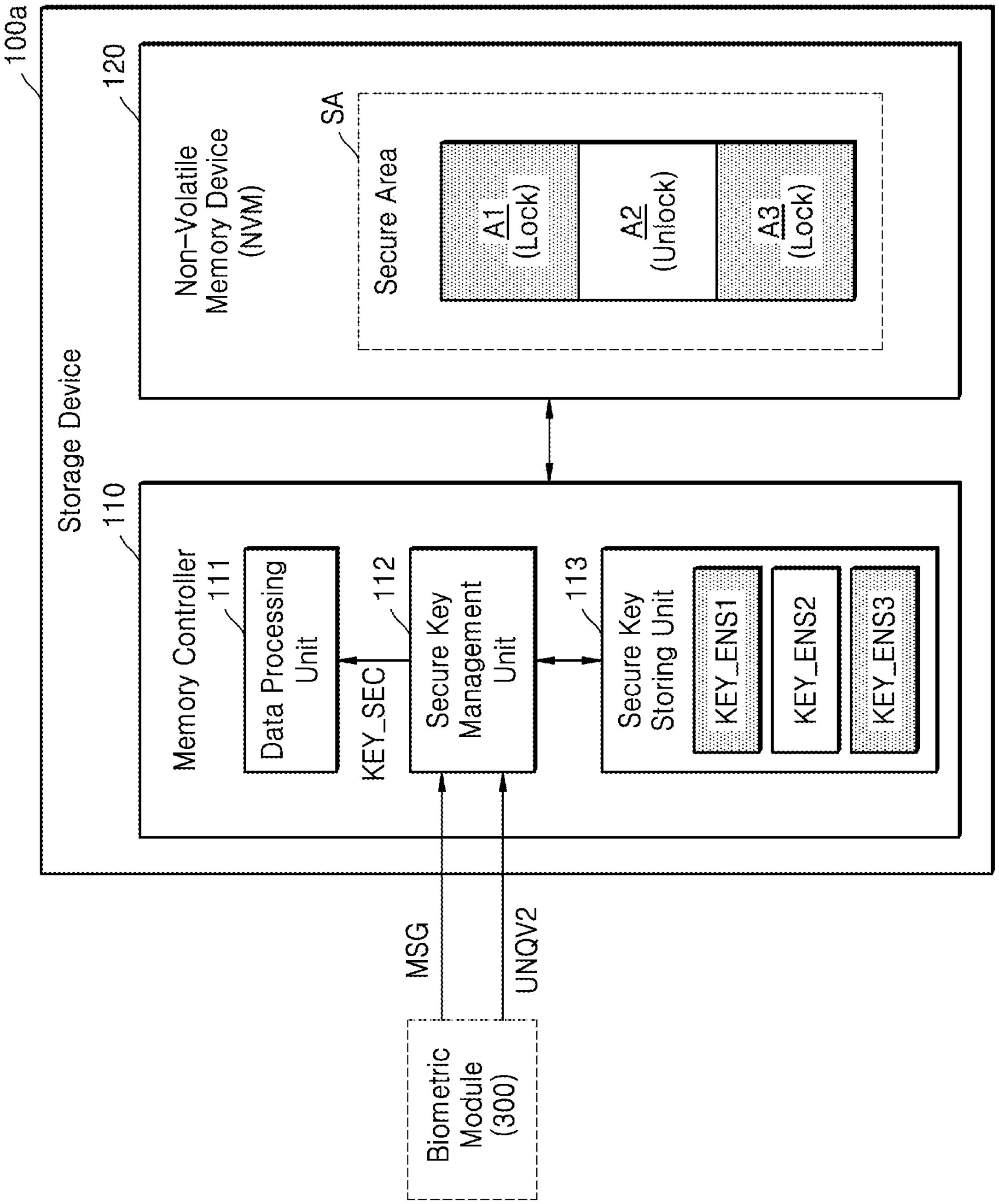

FIGS. 7A and 7B are diagrams for describing an example of an operating method of a storage device, according to an example embodiment. FIGS. 7A and 7B show the state of each area of the non-volatile memory device 120 according to user authentication in the case where a user authority over the non-volatile memory device 120 is set for each of a plurality of users (or each of a plurality of items of biometric information registered in the biometric module 300).

Referring to FIG. 7A, biometric information registration may be performed with respect to first through third users (or first biometric information, second biometric information, and third biometric information). The biometric module 300 may generate a first unique value UNQV1 for the first user, a second unique value UNQV2 for the second user, and a third unique value UNQV3 for the third user and may transmit the first through third unique values UNQV1, UNQV2, and UNQV3 to the memory controller 110. Biometric information registration may not be simultaneously performed with respect the first through third users but may be performed with respect to each of the first through third users when a command indicating an authority registration request or an authority addition request is received from the storage device 100*a*.

The memory controller 110 may respectively set user authorities (and/or access rights) for the first through third users based on the first through third unique values UNQV1, UNQV2, and UNQV3, respectively. For convenience of description, it is assumed that the first user has a user authority over the first area A1, the second user has a user authority over the second area A2, and the third user has a user authority over the third area A3.

However, example embodiments are not limited thereto. The first user may have a user authority over the first through third areas A1, A2, and A3, the second user may have a user authority over the second area A2, and the third user may have a user authority over the third area A3. Alternatively, the first and second users may have a user authority over the secure area SA of the non-volatile memory device 120. At this time, the first user may have a user authority over the first and second areas A1 and A2 and the second user may have a user authority over the second and third areas A2 and A3. As described above, a user authority of each of a plurality of users over a plurality of areas of the non-volatile memory device 120 may vary.

When the secure key management unit 112 receives the first unique value UNQV1 for the first user, the secure key management unit 112 may encrypt the secure key KEY_SEC based on the first unique value UNQV1, and may store a first encrypted secure key KEY_ENS1 in the secure key storing unit 113. Similarly, when the secure key management unit 112 receives the second unique value UNQV2 for the second user and the third unique value UNQV3 for the third user, the secure key management unit 112 may encrypt the secure key KEY_SEC based on each of the second and third unique values UNQV2 and UNQV3 and may store a second encrypted secure key KEY_ENS2 and a third encrypted secure key KEY_ENS3, which are generated by encryption, in the secure key storing unit 113. The first through third areas A1, A2, and A3 may be set to a locked state. Referring to FIG. 7B, when the memory controller 110 receives the message MSG indicating successful biometric authentication and the second unique value UNQV2 from the biometric module 300, the memory controller 110 may change the second area A2 into an unlocked state according to the user authority of the second user and may decrypt the second encrypted secure key KEY_ENS2 based on the second unique value UNQV2. The host 200 (in FIG. 1) may access the second area A2. The data processing unit 111 may encrypt user data to be written to the second area A2 and/or decrypt user data read from the second area A2, based on the secure key KEY_SEC, according to a command from the host 200.

Figure 8:
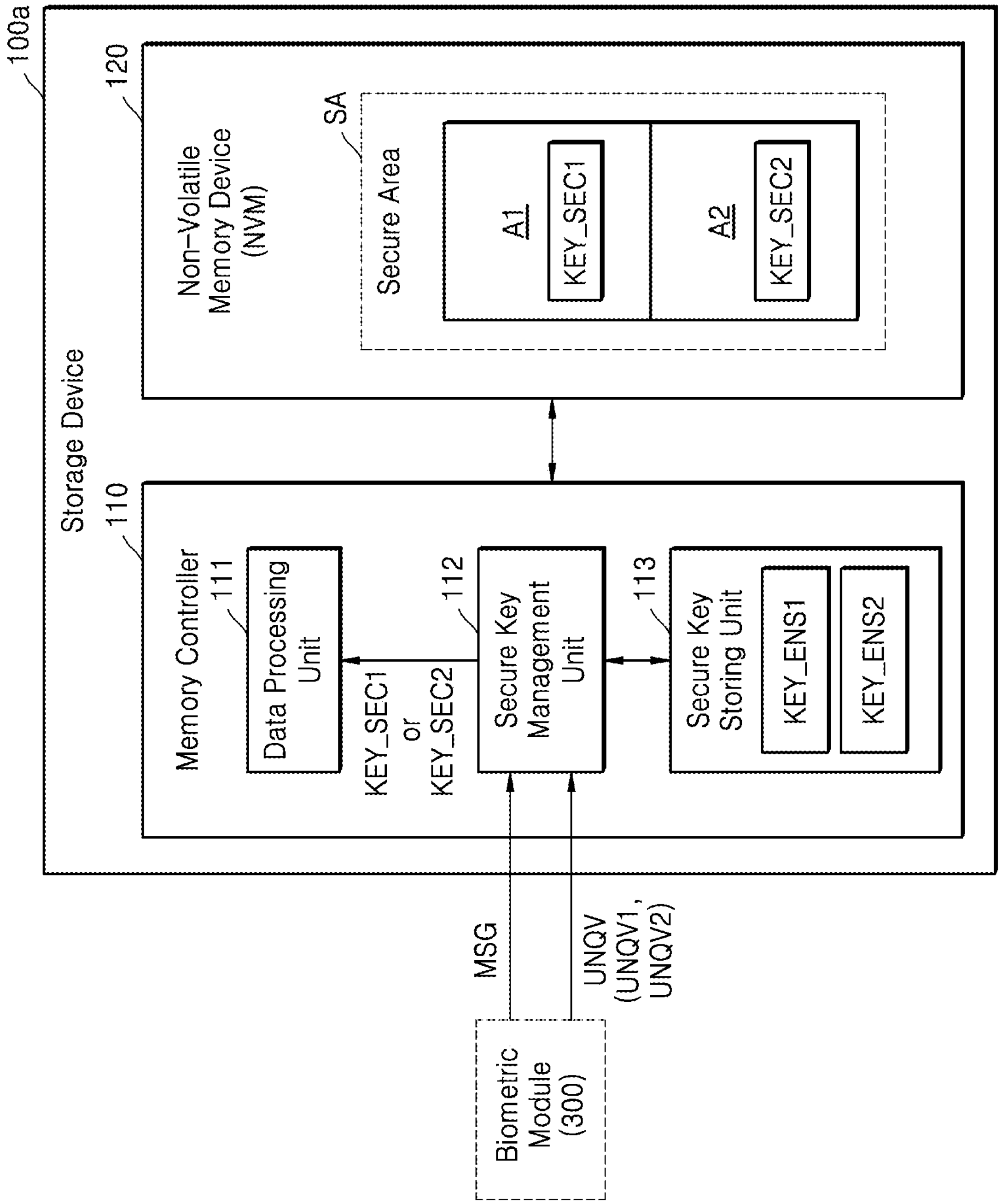
FIG. 8 is a diagram for describing an example of an operating method of a storage device, according to some example embodiments.

FIG. 8 is a diagram for describing an example of an operating method of a storage device, according to some example embodiments.

Referring to FIG. 8, biometric information registration may be performed with respect to a first user (or first biometric information) and a second user (or second biometric information). The biometric module 300 may generate the first unique value UNQV1 for the first user and the second unique value UNQV2 for the second user and may transmit the first unique value UNQV1 and the second unique value UNQV2 to the memory controller 110.

The memory controller 110 may set a user authority (e.g. an access right) based on each of the first unique value UNQV1 and the second unique value UNQV2. In some example embodiments, the secure area SA of the non-volatile memory device 120 may include the first area A1 and the second area A2, which may respectively correspond to a first secure key KEY_SEC1 and a second secure key KEY_SEC2. In other words, the data processing unit 111 may encrypt and decrypt data of the first area A1 based on the first secure key KEY_SEC1 and may encrypt and decrypt data of the second area A2 based on the second secure key KEY_SEC2. The first user may have a user authority over the first area A1 and the second user may have a user authority over the second area A2.

When the secure key management unit 112 receives the first unique value UNQV1, the secure key management unit 112 may encrypt the first secure key KEY_SEC1 based on the first unique value UNQV1 and store the first encrypted secure key KEY_ENS1 in the secure key storing unit 113. Similarly, when the secure key management unit 112 receives the second unique value UNQV2, the secure key management unit 112 may encrypt the second secure key KEY_SEC2 based on the second unique value UNQV2 and store the second encrypted secure key KEY_ENS2 in the secure key storing unit 113. The first area A1 and the second area A2 may be set to a locked state. Thereafter, during user authentication, when the first unique value UNQV1 is received, the first encrypted secure key KEY_ENS1 may be decrypted based on the first unique value UNQV1 so that the first area A1 may be set to an unlocked state. When the second unique value UNQV2 is received, the second encrypted secure key KEY_ENS2 may be decrypted based on the second unique value UNQV2 so that the second area A2 may be set to the unlocked state.

Figure 9A:
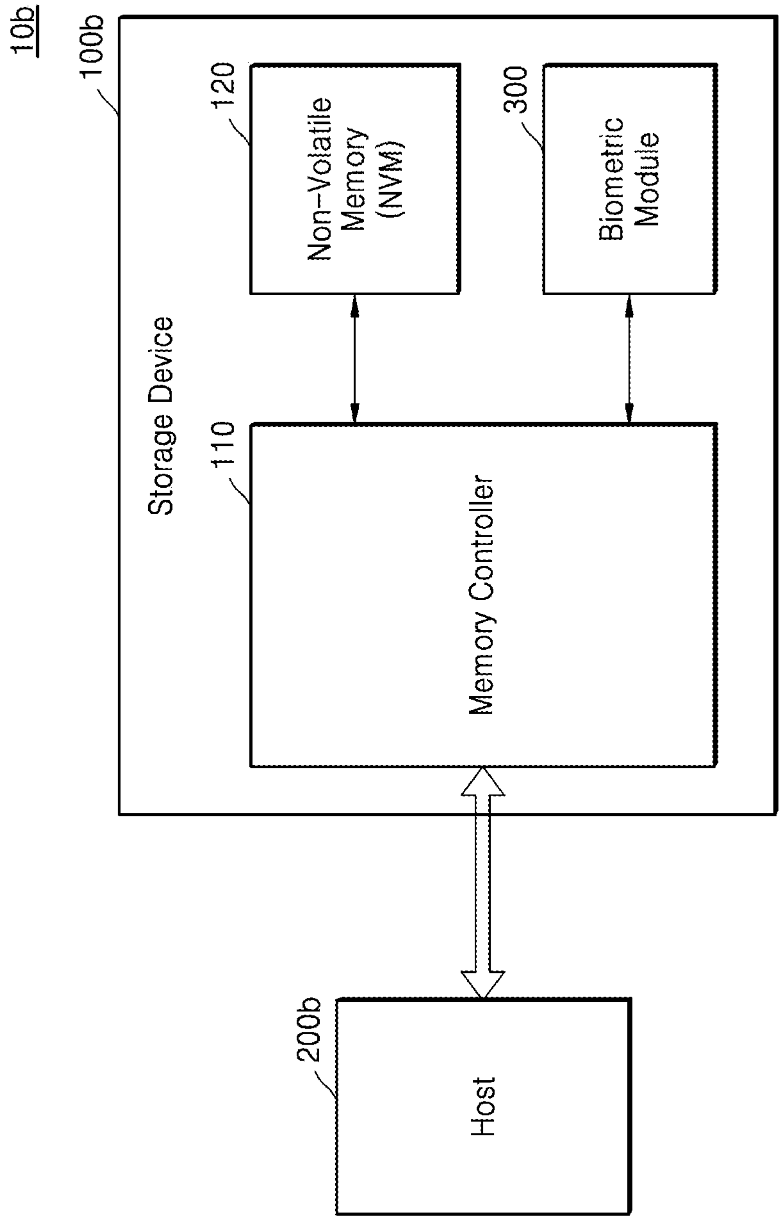
FIGS. 9A through 9C are block diagrams of storage systems according to some example embodiments.
Figure 9B:
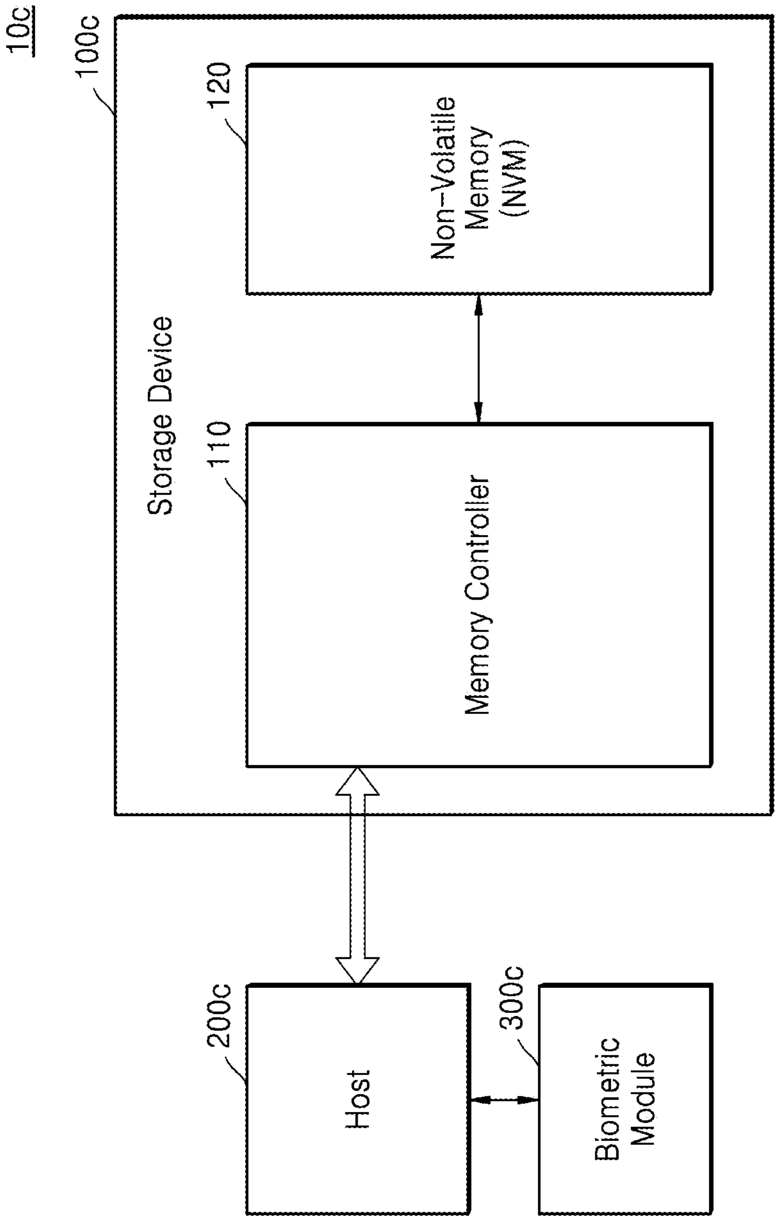
Figure 9C:
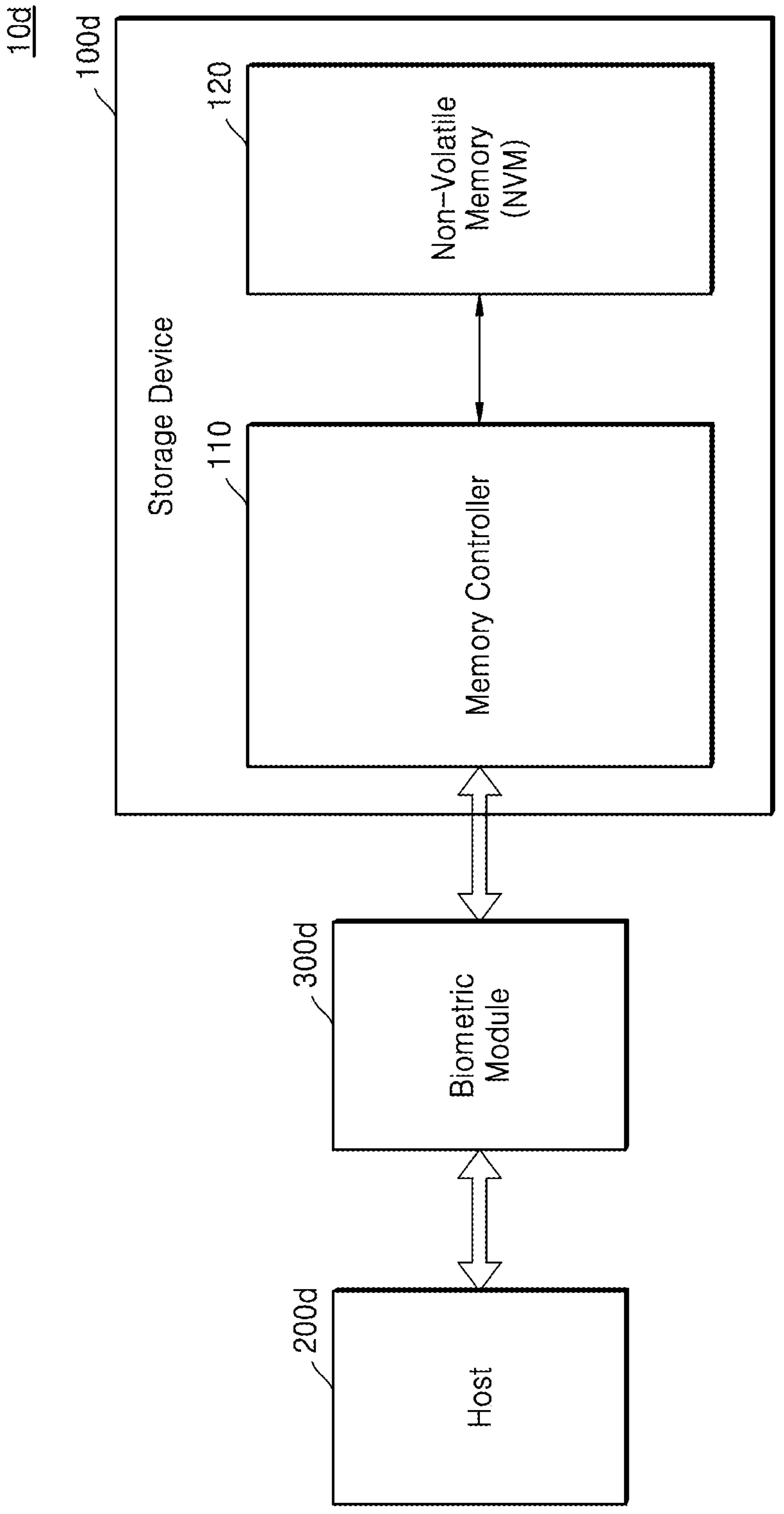

FIGS. 9A through 9C are block diagrams of storage systems according to some example embodiments.

Referring to FIG. 9A, a storage system 10*b* may include a host 200*b* and a storage device 100*b*. The biometric module 300 may be included in the storage device 100*b*. The biometric module 300 may include a second processor distinct from the (first) processor included in the memory controller 110. The biometric module 300 may communicate with the memory controller 110 in the storage device 100*b*. As described above, the biometric module 300 may sense a user's biometric data and transmit a unique value for the user and a biometric authentication message to the memory controller 110. The memory controller 110 may encrypt or decrypt user data based on the unique value from the biometric module 300.

Referring to FIG. 9B, a storage system 10*c* may include a host 200*c*, a storage device 100*c*, and a biometric module 300*c*. The biometric module 300*c* may communicate with the storage device 100*c* through the host 200*c*. The biometric module 300*c* may transmit a biometric authentication message and a unique value to the storage device 100*c* through the host 200*c*. In some example embodiments, the biometric module 300*c* may be implemented as a part of the host 200*c*.

Referring to FIG. 9C, a storage system 10*d* may include a host 200*d*, a storage device 100*d*, and a biometric module 300*d*. The biometric module 300*d* may directly communicate with the storage device 100*d* and the host 200*d* may communicate with the storage device 100*d* through the biometric module 300*d*. For example, the biometric module 300*d* may operate as a repeater.

Figure 10:
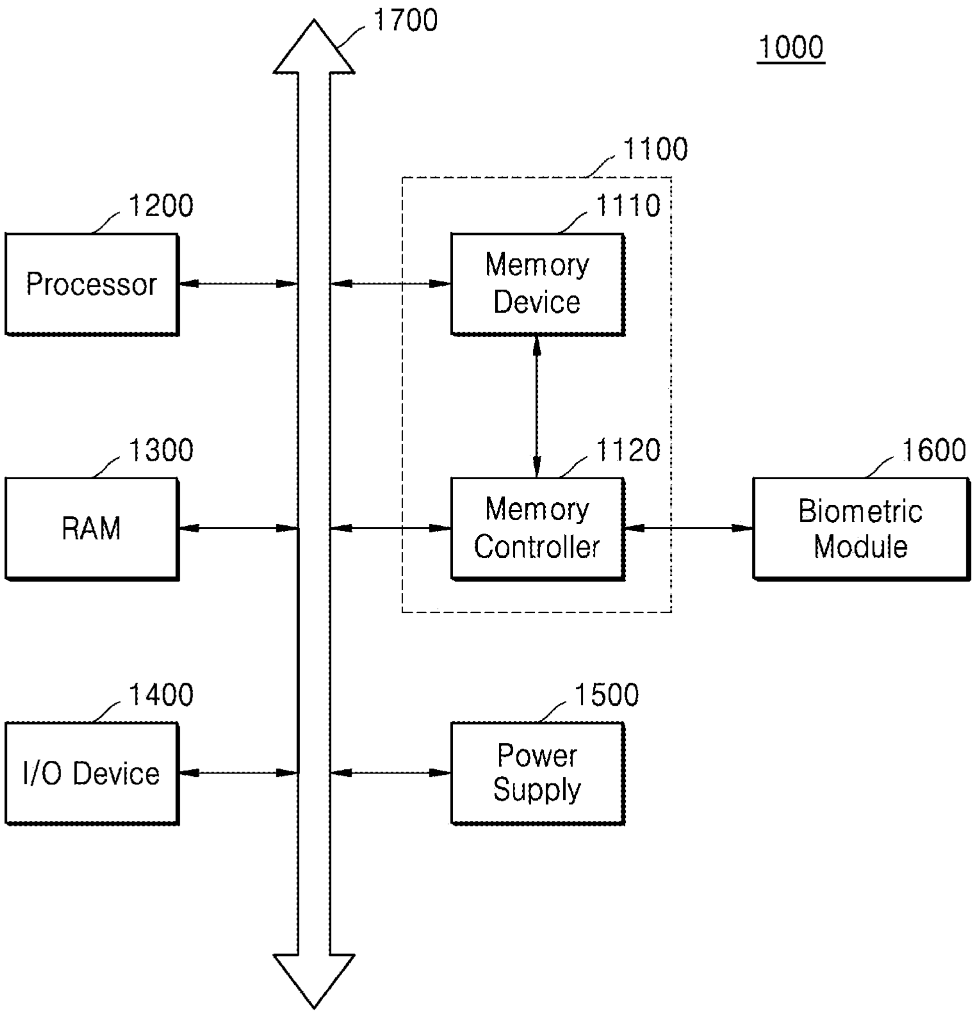
FIG. 10 illustrates a computing system according to some example embodiments.

FIG. 10 illustrates a computing system according to an example embodiment.

Referring to FIG. 10, a computing system 1000 may include a memory system 1100, a processor 1200, RAM 1300, an input/output (I/O) device 1400, a power supply 1500, and a biometric module 1600. Although not shown, the computing system 1000 may further include ports that may communicate with a video card, a sound card, a memory card, a USB device, and the like or may communicate other electronic devices. The computing system 1000 may include a PC or a portable electronic device such as a notebook computer, a mobile phone, a PDA, or a camera.

The processor 1200 may perform particular calculations or tasks. According to some example embodiments, the processor 1200 may include a microprocessor or a CPU. The processor 1200 may communicate with the RAM 1300, the I/O device 1400, and the memory system 1100 through a bus 1700 which includes an address bus, a control bus, and a data bus. The processor 1200 may be connected to an extension bus such as a peripheral component interconnect (PCI) bus.

The memory system 1100 and the biometric module 1600 may be implemented using the storage device 100, 100*a*, 100*b*, 100*c*, or 100*d* and the biometric module 300, 300*a*, 300*c*, or 300*d*, which have been shown in FIGS. 1 through 9C. The memory system 1100 may include a storage device supporting self-encryption and may encrypt and/or decrypt user data based on a unique value received from the biometric module 1600.

The RAM 1300 may store data needed for the operation of the computing system 1000. For example, the RAM 1300 may include DRAM, mobile RAM, SRAM, PRAM, ferroelectric RAM (FRAM), resistive RAM (RRAM), and/or MRAM. The I/O device 1400 may include an input unit such as a keyboard, a keypad, or a mouse and an output unit such as a printer or a display. The power supply 1500 may supply an operating voltage needed to operate the computing system 1000.

Figure 11:
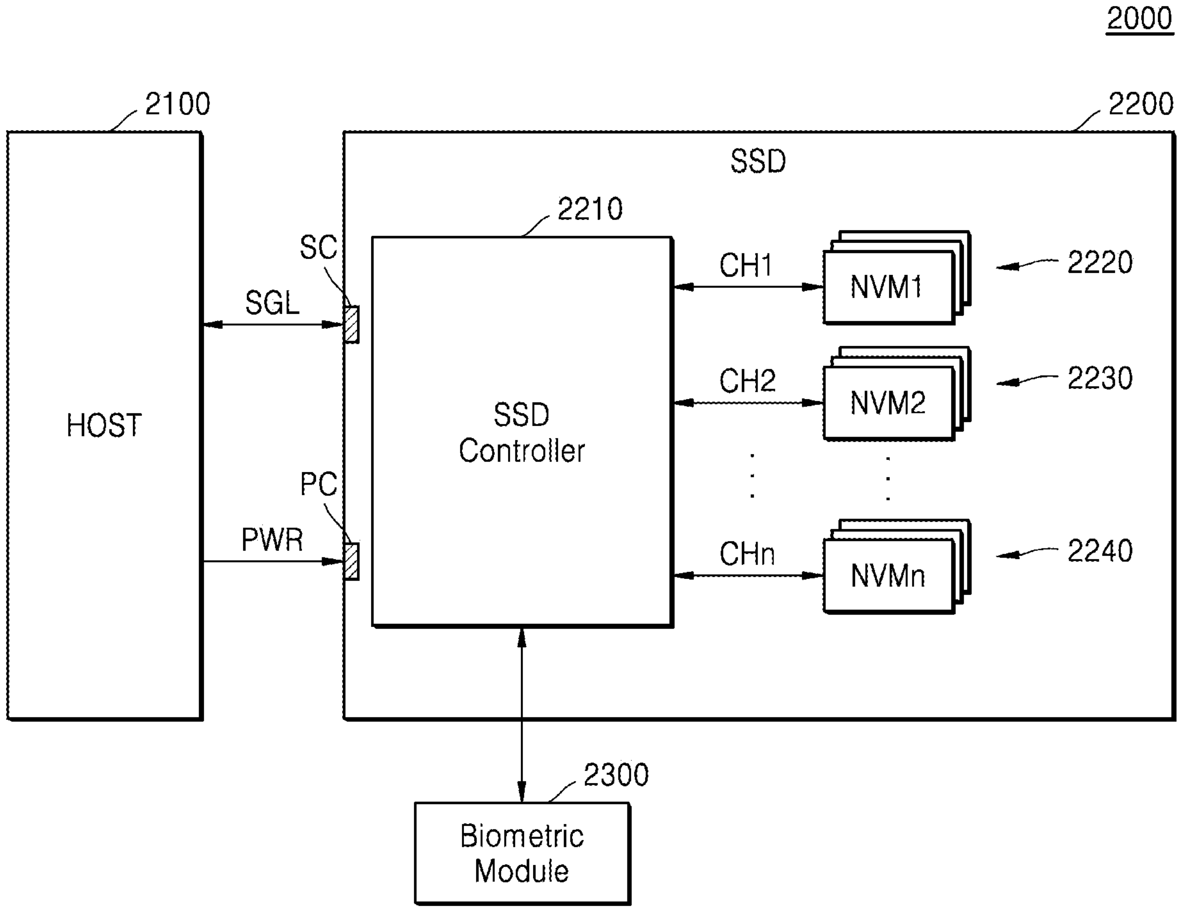
FIG. 11 is a block diagram of a solid state drive (SSD) system according to some example embodiments.

FIG. 11 is a block diagram of an SSD system according to an example embodiment.

Referring to FIG. 11, an SSD system 2000 may include a host 2100, an SSD 2200, and a biometric module 2300. In some example embodiments, the biometric module 2300 may be embedded in the SSD 2200.

The SSD 2200 may exchange signals SGL with the host 2100 through a signal connector SC and may receive power PWR from the host 2100 through a power connector PC.

The SSD 2200 may include an SSD controller 2210 and a plurality of non-volatile memory devices (NVM1, NVM2, and NVMn) 2220, 2230, and 2240. The storage devices 100, 100*a*, 100*b*, 100*c*, and 100*d* in FIGS. 1 through 9C may be applied to the SSD 2200. The SSD controller 2210 may communicate with the non-volatile memory devices 2220, 2230, and 2240 through a plurality of channels CH1, CH2, and CHn, respectively. The SSD controller 2210 may encrypt user data, which is written to the non-volatile memory devices 2220, 2230, and 2240, and decrypt user data, which is read from the non-volatile memory devices 2220, 2230, and 2240, based on a unique value corresponding to a user's biometric data, wherein the unique value is received from the biometric module 2300.

As used herein, some or all of the components are named and illustrated in the figures by using the terms "controller", "circuit", "circuitry", "unit", or "module", "processor", "processing circuitry", "device". The components named by using the terms may be implemented with various hardware devices, such as an integrated circuit (IC), an application specific IC (ASCI), a field programmable gate array (FPGA), or a complex programmable logic device (CPLD), firmware driven at the hardware devices, software such as an application executing on hardware, or a combination of a hardware device and software or may include circuits and/or an intellectual property (IP) implemented with semiconductor elements in the IC. The terms "controller", "circuit", "circuitry", "processing circuitry", and "device", "module", etc. may be interchangeable and/or may be used to express such physical components. Terms such as "controller", "circuit", "circuitry", "processing circuitry", "device", "module", etc. may refer to hardware such as processors that are able to run non-transitory machine-readable instructions that, when executed, cause the controller/circuit/circuitry/processing circuitry/device/module etc. to perform specific functions.

A storage system according to some example embodiments may also be mounted on or applied to a memory card system, a computing system, UFS, etc. besides the SSD system 2000.

While inventive concepts has been particularly shown and described with reference to example embodiments thereof, it will be understood that various changes in form and details may be made therein without departing from the spirit and scope of the following claims.

What is claimed is:

1. A storage system comprising:

a solid state drive including:

a non-volatile memory device including a secure area and a non-secure area, and a memory controller configured to write data to the non-volatile memory device and read data from the non-volatile memory device in response to a command from a host; and the storage system further including a biometric module configured to receive a registration trigger signal from the memory controller included in the solid state drive and to transmit a biometric information registration message to the memory controller included in the solid state drive, the biometric module including at least one sensor, a controller, a storing unit, and a digital serial interface, and configured to perform biometric authentication, wherein the biometric module is configured to perform the biometric authentication by:

obtaining biometric data of a user through the at least one sensor, converting the biometric data into first biometric information based on a predefined data format, storing the first biometric information in the storing unit during a first biometric information registration, comparing the first biometric information with second biometric information stored in the storing unit, generating a unique value based on the first biometric information in response to the first biometric information matching the second biometric information, and transmitting the unique value, index and a biometric authentication success message to the memory controller through the digital serial interface, wherein the index indicates an item of the second biometric information matches the first biometric information, and wherein the memory controller is configured to:

receive the unique value transmitted from the biometric module and set the solid state drive to an unlocked state in response to the biometric authentication success message, store a plurality of encrypted secure keys, respectively generated based on unique values associated with a plurality of users, identify a first encrypted secure key of the plurality of encrypted secure keys, wherein the first encrypted secure key corresponds to the unique value received together with the index from the biometric module from the plurality of the encrypted secure keys, based on the index, and perform user authentication by decrypting the first encrypted secure key based on the unique value to generate a secure key usable to encrypt data to be stored in the secure area of the non-volatile memory device and to decrypt data read from the secure area of the non-volatile memory device.

2. The storage system of claim 1, wherein the solid state drive is a locked state in an initial state of a connection between the solid state drive and the host.

3. The storage system of claim 1, wherein the memory controller is configured to load a master boot record stored in the secure area in response to an unlocked state of the solid state drive.

4. The storage system of claim 3, wherein the memory controller is configured to relink the solid state drive to the host.

5. The storage system of claim 1, wherein the biometric module is configured to generate a plurality of unique values to perform biometric information registration with respect to the plurality of users.

6. The storage system of claim 5, wherein the solid state drive is configured to set each user authority with respect to the plurality of users based on each unique value of the plurality of unique values.

7. The storage system of claim 1, wherein the digital serial interface in the biometric module is one of a universal asynchronous receiver transmitter (UART) interface, an inter-integrated circuit (I2C) interface, a serial peripheral interface (SPI), a mobile industry processor interface (MIPI), or an embedded display port (eDP) interface.

8. The storage system of claim 1, wherein the unique value includes a plurality of bytes of hash data.

9. The storage system of claim 1, wherein the biometric authentication success message includes a biometric authentication success signal.

10. The storage system of claim 1, wherein the memory controller is configured to decrypt encrypted data based on the secure key, the encrypted data being stored in the secure area of the non-volatile memory device.

11. The storage system of claim 1, wherein the memory controller is configured to determine a user authority of the user from a plurality of user authorities associated with the plurality of users, the determining of the user authority being based on the unique value, the user authority associated with a plurality of areas of the secure area.

12. The storage system of claim 11, wherein the plurality of areas includes at least three areas, and the user authority associated with the plurality of areas of the secure area includes authority over each of the at least three areas.

13. The storage system of claim 11, wherein the first biometric information includes fingerprint data, and the fingerprint data includes information about a distance between feature points of the fingerprint data.

14. The storage system of claim 13, wherein the fingerprint data includes information about a distance between a ridge and a valley of a feature point from among the feature points.

* * * * *